US012630145B2

(12) United States Patent
     Williams

(10) Patent No.: US 12,630,145 B2
(45) Date of Patent: *May 19, 2026

(54) POWERTRAIN CONTROLLER

(71) Applicant: Perkins Engines Company Limited, Peterborough (GB)

(72) Inventor: Gavin Williams, Stamford (GB)

(73) Assignee: Perkins Engines Company Limited, Peterborough (GB)

( * ) Notice: Subject to any disclaimer, the term of this patent is extended or adjusted under 35 U.S.C. 154(b) by 740 days.

This patent is subject to a terminal disclaimer.

(21) Appl. No.: 17/795,135

(22) PCT Filed: Jan. 15, 2021

(86) PCT No.: PCT/EP2021/025013
     § 371 (c)(1),
     (2) Date: Jul. 25, 2022

(87) PCT Pub. No.: WO2021/148240
     PCT Pub. Date: Jul. 29, 2021

(65)          Prior Publication Data
     US 2023/0071466 A1     Mar. 9, 2023

(30)       Foreign Application Priority Data
     Jan. 24, 2020    (GB) ..................................... 2001057

(51) Int. Cl.
     *B60W 20/15* (2016.01)
     *B60W 10/06* (2006.01)
     (Continued)
(52) U.S. Cl.
     CPC ............ *B60W 20/15* (2016.01); *B60W 10/06* (2013.01); *B60W 10/08* (2013.01); *B60W 10/26* (2013.01); *B60W 30/188* (2013.01); *G05B 17/02* (2013.01)

(58) Field of Classification Search
     CPC ................. B60W 20/11; B60W 10/08; B60W 2050/0039; B60W 2050/0041;
     (Continued)

(56)          References Cited

U.S. PATENT DOCUMENTS

2004/0034460 A1* 2/2004 Folkerts ............ B60W 50/0097
                                                          701/54
2010/0131135 A1 5/2010 Jaensch
                    (Continued)

FOREIGN PATENT DOCUMENTS

CN          101968630 B      7/2012
CN          105102288        11/2015
                    (Continued)

OTHER PUBLICATIONS

United Kingdom Search Report related to Application No. GB2001057.5 reported on Jul. 22, 2020.
                    (Continued)

*Primary Examiner* — Peter D Nolan
*Assistant Examiner* — Demetra R Smith-Stewart

(57)          ABSTRACT

A universal controller for a powertrain is provided. The universal controller comprises a configurable powertrain model which is configurable to model a class of generic powertrains comprising J generic power sources, K generic power sinks, and L generic couplings. The universal controller is arranged to receive an input file comprising a plurality of input parameters to configure the configurable powertrain model of the universal controller to control a specific powertrain having a powertrain architecture comprising N power sources, M power sinks, and X couplings. The configurable powertrain model is configured to model the specific powertrain based using N power source models, M power sink models, X coupling models, and a model architecture which may be defined from a generic pow-
(Continued)

ertrain component library and a connection parameter module.

14 Claims, 14 Drawing Sheets

(51) Int. Cl.

| | | |
|---|---|---|
| *B60W 10/08* | (2006.01) | |
| *B60W 10/26* | (2006.01) | |
| *B60W 30/188* | (2012.01) | |
| *G05B 17/02* | (2006.01) | |

(58) Field of Classification Search

CPC ... B60W 2050/0018; B60W 2050/004; B60W 10/06; F02D 41/1406; F02D 41/2429; F02D 41/2425; F02D 2041/1433; F02D 41/266; F02D 41/14; Y02T 10/62; B60K 2702/00; B60K 2704/00

See application file for complete search history.

(56) References Cited

U.S. PATENT DOCUMENTS

| | | | |
|---|---|---|---|
| 2013/0138290 A1 | 5/2013 | Falkenstein | |
| 2016/0265631 A1* | 9/2016 | Strashny | B60K 6/445 |
| 2017/0262575 A1 | 9/2017 | Mueller | |
| 2020/0049089 A1* | 2/2020 | Charbonnel | G05B 17/02 |

FOREIGN PATENT DOCUMENTS

| | | |
|---|---|---|
| CN | 106682323 | 5/2017 |
| DE | 102017103447 | 8/2017 |
| DE | 102018004289 A1 | 12/2018 |
| DE | 102019105542 A1 | 9/2019 |
| IN | 201814020075 A | 12/2018 |
| KR | 101424753 B1 | 8/2014 |
| WO | 2020064203 A1 | 4/2020 |
| WO | 2021148240 A1 | 7/2021 |

OTHER PUBLICATIONS

International Search Report related to Application No. PCT/EP2021/025013 reported on Apr. 28, 2021.

Filippa M et al: "Modeling of a Hybrid Electric Vehicle Powertrain Test Cell Using Bond Graphs", IEEE Transactions on Vehicular Technology, IEEE Service Center, Piscataway, NJ, US, vol. 54, No. 3, May 1, 2005 (May 1, 2005), pp. 837-845, XP011132638, ISSN: 0018-9545, DOI: 10.1109/TVT.2005.847226 the whole document.

Hubbard G.A. et al: "Modeling and simulation of a hybrid-electric vehicle drivetrain", Proceedings of 16th American Control Conference Jun. 4-6, 1997 Albuquerque, NM, USA, vol. 00, Jan. 1, 1997 (Jan. 1, 1997), p. 636, XP055796349, Proceedings of the 1997 American Control Conference (Cat. No. 97CH36041) American Autom. Control Council Evanston, IL, USA DOI: 10.1109/ACC. 1997.611878 ISBN: 978-0-7803-3832-6 Retrieved from the Internet:, the whole document.

Kleijn C. et al: "Getting Started with 20-sim 4.6", Jan. 1, 2017 (Jan. 1, 2017), XP055796348, Retrieved from the Internet: URL:https://www.20sim.com/downloads/files/20simGettingStarted46.pdf [retrieved on Apr. 16, 2021] p. 9, p. 71-p. 75, p. 160.

Karnopp Dean C. et al: "System Dynamics" In: "System Dynamics", Jan. 1, 2000 (Jan. 1, 2000), John Wiley and Sons, XP055796347, ISBN: 978-0-471-33301-2 pp. 1-507, table of contents p. 10, p. 17-p. 19, p. 31, p. 34, p. 37-p. 38, p. 43, p. 46-p. 47, p. 259-262, p. 278-p. 281, p. 333-p. 335.

* cited by examiner

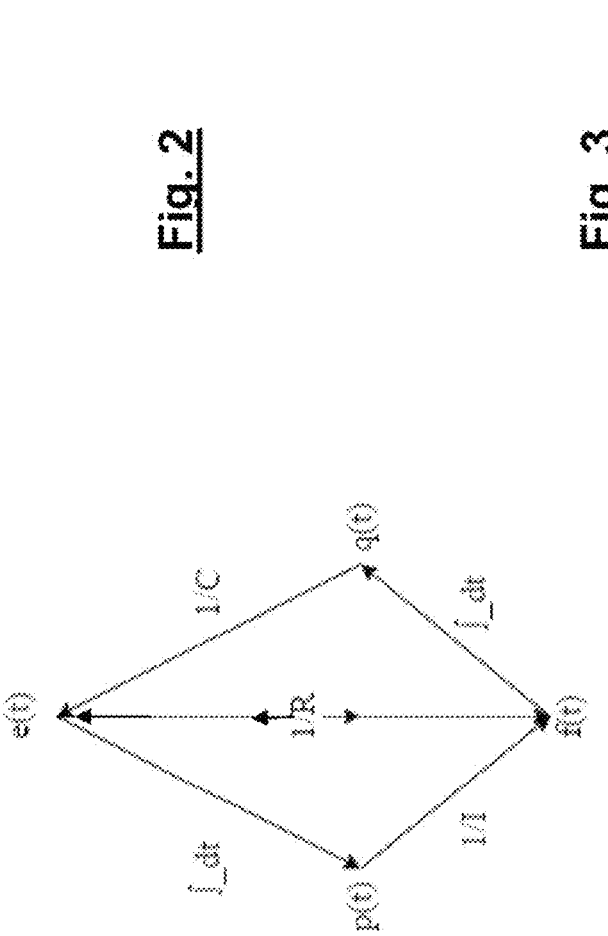

| Energy Domain | | Generalised flow f(t) | Generalized effort e(t) | Generalized displacement q(t) | Generalized momentum p(t) | Resistance R | Inertance I | Compliance C |
|---|---|---|---|---|---|---|---|---|
| Generalised | Name | Generalized flow | Generalized effort | Generalized displacement | Generalized momentum | Resistance | Inertance | Compliance |
| | Symbol | $f(t)$ | $e(t)$ | $q(t)$ | $p(t)$ | $R$ | $I$ | $C$ |
| Linear Mechanical | Name | Velocity | Force | Displacement | Linear momentum | Damping constant | Mass | Inverse of the spring constant |
| | Symbol | $v(t)$ | $F(t)$ | $x(t)$ | $p(t)$ | $b$ | $m$ | $1/k$ |
| | Units | m/s | N | m | Ns | N s/m | kg | m/N |
| Angular Mechanical | Name | Angular velocity | Torque | Angular displacement | Angular momentum | Angular damping | Mass moment of inertia | Inverse of the angular spring constant |
| | Symbol | $\omega(t)$ | $T(t)$ | $\theta(t)$ | $p_a(t)$ | $B$ | $J$ | $1/k_a$ |
| | Units | rad/s | N m | rad | N m s | rad/ N m s | kg m² | 1/(N m) |
| Electromagnetic | Name | Current | Voltage | Charge | Flux linkage | Resistance | Inductance | Capacitance |
| | Symbol | $i(t)$ | $v(t)$ | $q(t)$ | $\lambda(t)$ | $R$ | $L$ | $C$ |
| | Units | A | V | C | Vs | Ω | H | F |
| Hydraulic | Name | Volume flow rate | Pressure | Volume | Fluid momentum | Fluid resistance | Fluid inductance | Storage |
| | Symbol | $p(t)$ | $p(t)$ | $V(t)$ | $p(t)$ | $R(t)$ | $L$ | $C_s$ |
| | Units | m³/s | Pa | m³ | Pa s | Pa s / m³ | Pa s²/ m³ | m³ / Pa |

Generator 100

Generator 100'

Second powertrain 200

Third powertrain 300

Fourth powertrain
400

POWERTRAIN CONTROLLER

CROSS-REFERENCE TO RELATED APPLICATION

This Application is a 35 USC § 371 US National Stage filing of International Application No. PCT/EP2021/025013 filed on Jan. 15, 2021 and claims priority to GB Patent Application No. 2001057.5 filed on Jan. 24, 2020.

TECHNICAL FIELD

The present invention relates to the control of a powertrain. For example, the present invention relates to the control of a powertrain such as a powertrain comprising at least one of an internal combustion engine, a hydrogen fuel cell, or a battery.

BACKGROUND

A powertrain is a system which includes one or more components which generate power (power sources) and one or more components which are arranged to deliver that power in a desired form. For example, for a motor vehicle, a powertrain may comprise an internal combustion engine, a gear box (also known as a transmission), a drive shaft, a differential, and a set of wheels which are in contact with a driving surface.

For example, FIG. 1A shows a schematic example of a powertrain for a motor vehicle. In the above example, the powertrain comprises a single power source, the internal combustion engine. The internal combustion engine is connected to a clutch and a gearbox which is in turn connected to a drive output (e.g. wheels). In other powertrains, components such as the clutch and gearbox may not be present. For example, in FIG. 1B a schematic diagram of a powertrain comprising an internal combustion engine and a drive output is shown (i.e. a direct drive powertrain).

In other powertrains, more than one power source may be present. For example, in a hybrid powertrain, there may be a plurality of power sources present, such as an internal combustion engine and an electric motor/generator. For example, FIGS. 1C and 1D are examples of hybrid powertrains including an internal combustion engine and a motor generator. In the examples of FIGS. 1C and 1D, a gearbox and a clutch are also provided. It will be appreciated from FIGS. 1C and 1D that the arrangement of the clutch, gearbox and motor generator may be varied depending on the powertrain architecture.

In order to operate a powertrain, a controller is typically provided to control the powertrain. For example, in the motor vehicle example above, a controller may be provided to control the powertrain to provide a desired drive output to the wheels. One class of controller may use a set of pre-defined rules or heuristic methods to control the powertrain. Another class of controller may include a model of the powertrain which allows for the determination of suitable control settings for the powertrain. For example, the controller may use a model of the powertrain to determine suitable actuator input setpoints for actuators of the internal combustion engine.

For hybrid powertrains, the presence of multiple power sources having different energy domains increases the complexity of the control problem. Furthermore, as the design of powertrains, in particular hybrid powertrains becomes more complex, the number of possible arrangements of the powertrain components increases significantly. For example, for a hybrid powertrain comprising an internal combustion engine and an electric motor, multiple configurations of the power sources in either parallel or series are possible. As such, the control of a specific powertrain is challenging as the architecture of the specific powertrain may have a relatively complex and unique architecture. Furthermore, it can be challenging to design and evaluate a controller for such a powertrain which is not inherently biased towards a particular control solution.

Against this background there is provided a universal powertrain controller.

SUMMARY

According to a first aspect of the disclosure, a universal controller for a powertrain is provided. The universal controller comprises a configurable powertrain model.

The configurable powertrain model is configurable to model a class of generic powertrains comprising J generic power sources, K generic power sinks, and L generic couplings. The universal controller is arranged to receive an input file comprising a plurality of input parameters to configure the configurable powertrain model of the universal controller to control a specific powertrain having a powertrain architecture comprising N power sources, M power sinks, and X couplings.

The configurable powertrain model comprises a generic powertrain library and a connection parameter module.

The generic powertrain component library is configured to provide a model of each of the N power sources, M power sinks and X couplings of the specific powertrain. The generic powertrain component library comprises:

(i) a plurality of configurable first component models from which N power source models are configurable based on first input parameters of the input file, the N power source models representative of the N power sources of the specific powertrain, wherein each first component model is configured to receive at least one of a plurality of first component specific inputs and to calculate an effort output or flow output based on the at least one of the plurality of first component specific inputs;

(ii) a plurality of configurable second component models from which M power sink models are configurable based on second input parameters of the input file, the M power sink models representative of the M power sinks of the specific powertrain wherein each second component model is configured to receive at least one of a plurality of second component specific inputs and to calculate an effort output or flow output based on at least one of the plurality of second component specific inputs;

(iii) a plurality of configurable third component models from which at least one inertance coupling model is configurable based on third input parameters of the input file, wherein each third component model is configured to receive a plurality of effort inputs and to calculate a flow output based on the effort inputs; and (iv) a plurality of fourth component models from which a compliance based coupling model is configurable based on fourth input parameters of the input file, wherein each fourth component model is configured to receive a plurality of flow inputs and to calculate an effort output; and wherein the inertance coupling models and the compliance based coupling models are representative of the X couplings of the specific powertrain.

The connection parameter module is configured to define a model architecture of the N power source models, M power sink models and X coupling models which is representative of the powertrain architecture based on flow weight parameters and effort weight parameters of the input file. The flow weight parameters define any flow connections from the flow outputs of the N power source models, the flow outputs of the M power sink models, and the flow outputs of the inertance coupling models of the X couplings to the flow inputs of the compliance based coupling models of the X couplings of the model architecture. The effort weight parameters define any effort connections from the effort outputs of the N power source models, the effort outputs of the M power sink models, and the effort outputs of the compliance based coupling models of the X couplings to the effort inputs of the inertance coupling models of the X coupling models of the model architecture. The configurable powertrain model is configured to model the specific powertrain based on the N power source models, M power sink models, X coupling models, and the model architecture.

The universal powertrain controller comprises a configurable powertrain model. The configurable powertrain model comprises a plurality of component models of powertrain components. The component models can be configured by a (e.g. user-specified) input file to model a wide range of different powertrain architectures. As such, based on a first input file the configurable powertrain model can be configured to model a specific powertrain architecture comprising $N_1$ power sources, $M_1$ power sinks, and $X_1$ couplings. A second (different) input file could be used to configure the configurable powertrain model to model a specific powertrain architecture comprising $N_2$ power sources, $M_2$ power sinks, and $X_2$ couplings. Thus, it will be appreciated that the configurable powertrain model may be configured to model a class of generic powertrains, the generic powertrain class comprising J generic power sources, K generic power sinks, and L generic couplings.

It will be appreciated that there is a large range of potential components which could be incorporated into a powertrain. Accordingly, the universal powertrain controller comprises a generic powertrain component library comprising a plurality of component models. The component models can be adapted to model a wide range of powertrain components based on input parameters specified in the input file. Thus, the universal powertrain controller can be configured to model a wide range of different powertrain components using only modifications to input parameters to the controller.

The configurable first component models of the generic powertrain component library may be configured to model a range of different power sources for a powertrain. Each configurable first component model is configured to receive at least one first component specific input from which an effort or flow output can be calculated. Accordingly, the generic powertrain component library can be configured to provide models for each of the N power sources in a specific powertrain.

Further, the configurable second component models of the generic powertrain component library may be configured to model a range of different power sinks for a powertrain. Each configurable second component model is configured to receive at least one second component specific input from which an effort or flow output can be calculated (the effort or flow output for the power sink having the possibility of being negative). Accordingly, the generic powertrain component library can be configured to provide models for each of the M power sinks in a specific powertrain.

The X couplings of the specific powertrain may be modelled by the configurable third component models and the configurable fourth component models of the generic powertrain component library. The couplings of a specific powertrain may comprise an inertance element and/or a compliance based element. Accordingly, the configurable third component models may be configured to provide inertance coupling models based on third input parameters of the input file. The configurable fourth component models may be configured to provide compliance based coupling models based on fourth input parameters of the input file. Thus, inertance coupling models and the compliance based coupling models may be configured from the generic powertrain component library to represent the X couplings of the specific powertrain.

It will be appreciated that the first, second, third and fourth component models of the generic component library are configurable to calculate either efforts or flows. As such, it will be appreciated that the component models are dynamic models (i.e. dynamic component models). That is to say, the dynamic component models are configured to account for time-dependent changes in the state(s) of the specific powertrain to be modelled. That is to say, the universal powertrain controller is capable of modelling a specific powertrain which is operating under non-steady state conditions.

The universal powertrain controller also includes a connection parameter module configured to define a model architecture based on the components of the specific powertrain to be modelled. The connection parameter module models the architecture of the specific powertrain based on the effort and flow weights included in the input file. As such, the architecture of the specific powertrain to be controlled can be modelled by the universal controller based on only an input file specified by a user.

Thus, the powertrain components and powertrain architecture are both defined by input file parameters. Therefore, the universal controller is configurable to model an entire class of powertrains with only modifications to parameters of the input file. As such, the universal controller can be configured (and reconfigured) to model a wide range of powertrains without the need to re-write and re-compile the universal controller. This in turn may reduce the overheads for developing and validating a controller for a specific powertrain.

BRIEF DESCRIPTION OF THE FIGURES

Embodiments of the present disclosure will now be described, by way of example only, with reference to the accompanying figures in which:

FIG. 2 shows a diagram of a tetrahedron of state;

FIG. 3 shows a table of various states in different energy domains;

DETAILED DESCRIPTION

According to an embodiment of the disclosure, a universal controller is provided. The universal controller comprises a configurable powertrain model for a powertrain. That is to say, the universal controller can be configured using an input file to provide a model of a powertrain for the universal controller. The universality of the controller allows the configurable powertrain model to be capable of modelling any powertrain within the class of generic powertrains comprising J generic power sources, K generic power sinks, and L generic couplings (where J, K, and L are each integers greater than 0).

The universal controller of this disclosure is able to control a wide range of powertrains, including powertrains which operate in a range of energy domains. This is achieved by modelling the transfer of physical energy through the powertrain using the concept of efforts and flows from Bond Graph Theory. Bond graph theory models energy transfer in a dynamic system based on the tetrahedron of state. In general, the dynamics of a physical system can be represented by an effort (e(t)), a flow (f(t)), a momentum (p(t)) and a displacement (q(t)). The relationship between these states can be shown in a tetrahedron of state, such as the tetrahedron of state shown in FIG. 2. According to the tetrahedron of state, any starting from one state, any of the other states can be calculated based on the relationships set out in the tetrahedron of state.

The tetrahedron of state can be applied to various energy domains. For example, FIG. 3 sets out the equivalent terms in a selection of energy domains. For example, in the angular mechanical energy domain, a torque is a form of effort, whilst an angular velocity is a flow. By applying the principal of conservation of energy, the physical relationship between various components of a powertrain (including hybrid powertrains) can be modelled by accounting for the transfer of energy through the powertrain (efforts to flows, flows to efforts).

Overview of the Universal Controller

Figure 1A:
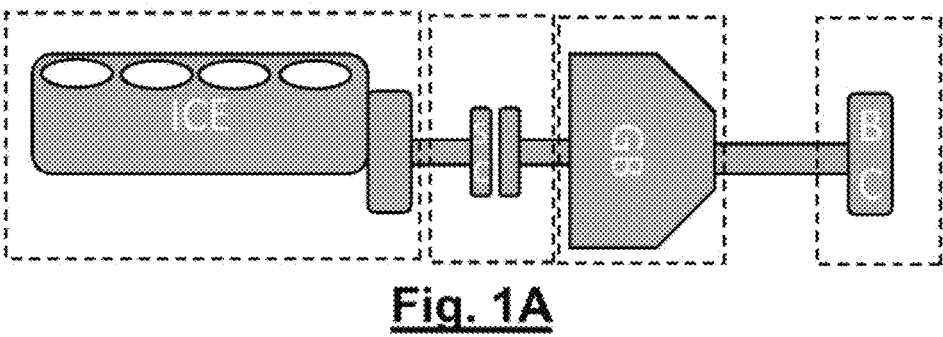
FIG. 1A shows a schematic diagram of an example of a first powertrain.
Figure 1B:
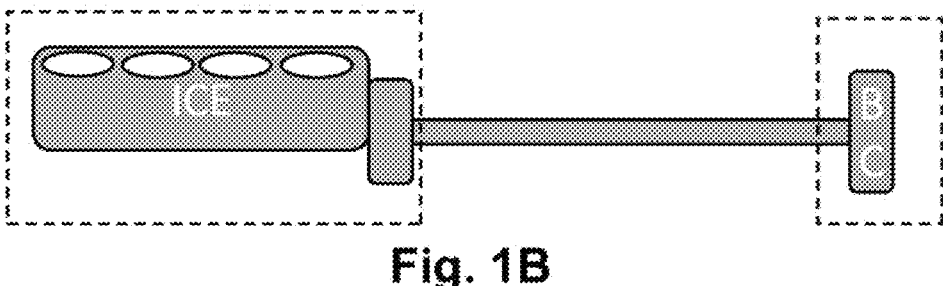
FIG. 1B shows a schematic diagram of an example of a second powertrain.
Figure 1C:
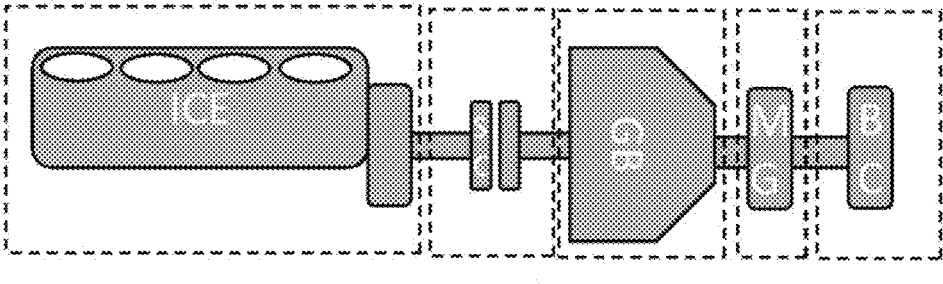
FIG. 1C shows a schematic diagram of an example of a third powertrain.
Figure 1D:
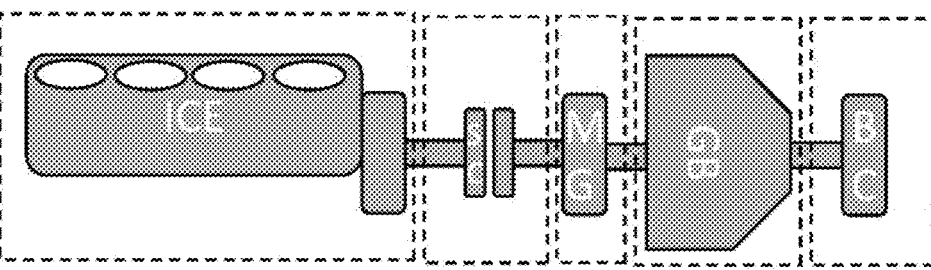
FIG. 1D shows a schematic diagram of an example of a fourth powertrain.
Figure 4:
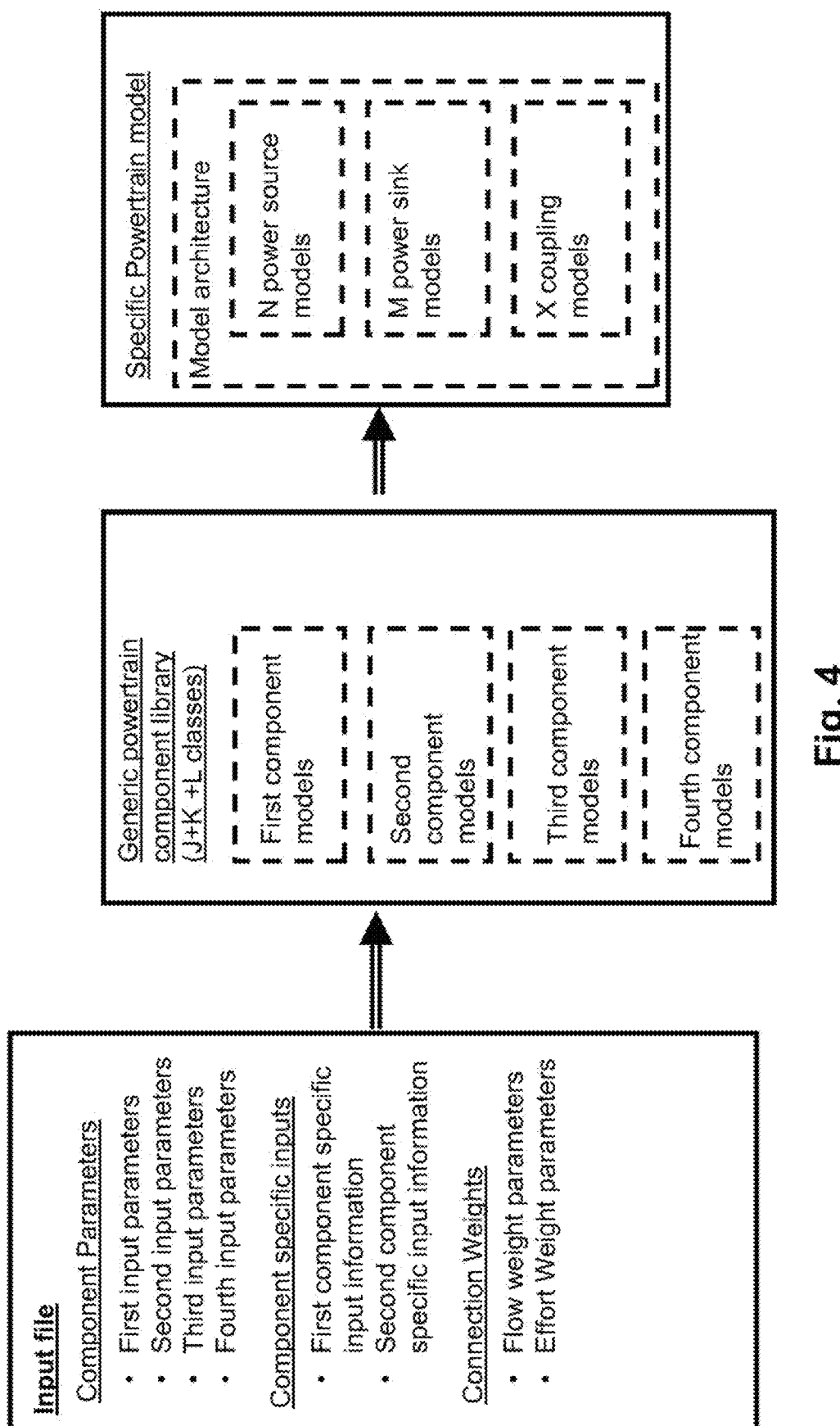
FIG. 4 shows an overview diagram of the inputs to the universal powertrain controller.

An overview of the universal controller is shown in FIG. 4. FIG. 4 shows a diagram of the input file, the generic component library and a (specific) powertrain model which the universal controller may be configured to generate. FIG. 4 explains that the input file includes a plurality of parameters. The input file parameters may be applied to component models in the generic component library of the universal controller. This results in the generation of a specific powertrain model including N power source models, M power sink models and X coupling models. The interactions between the including N power source models, M power sink models and X coupling models are governed by the model architecture.

Accordingly, the class of generic powertrains to be modelled includes at least one power sink, at least one power source, and at least one coupling (e.g. to link the power source to the power sink). The universal controller includes a generic component library of component models which allow the universal controller to model a wide range of different power sources, power sinks and couplings. The generic component library is discussed in more detail below.

In order to configure the configurable powertrain model, the universal controller is arranged to receive an input file. The input file includes information arranged to configure the universal powertrain controller to model a specific powertrain comprising N power sources, M power sinks, and X couplings arranged with a specific powertrain architecture. As such, the input file provides input parameters which configure the configurable powertrain model to provide N power source models, M power sink models, X coupling models, and a model architecture.

As shown in FIG. 4, the input file can include a plurality of input parameters. The input parameters are provided in order to configure each of the configurable component models of the generic powertrain component library. For example, the first input parameters are provided in order to configure the configurable first component models to represent the N power sources of the specific powertrain. The second input parameters are provided in order to configure the configurable second component models to represent the M power sinks of the specific powertrain. The third input parameters are provided in order to configure the configurable third and fourth component models to represent the X couplings of the specific powertrain. Further details of the input parameters are provided below.

The input file can also include information relating to the first and second component specific inputs. The first and second component specific inputs may be input variables to the universal controller which reflect a property of a component of the specific powertrain. For example, for a first component model which is configured to model an internal combustion engine (power source), the output of the component model may be a torque produced by the internal combustion engine (i.e. an effort output). The component specific inputs may be variables of the internal combustion engine which allow the first component model to calculate the effort output. For example, in one embodiment, the component specific inputs to a first component model representative of an internal combustion engine may comprise at least one of: Fuel mass flow. Exhaust gas recirculation (EGR), Start of Injection (SOI), Fuel Rail Pressure (FRP), Shot Mode, Turbo Boost, and Engine Speed.

It will be appreciated that the component specific inputs, as well as the efforts and flows that the universal powertrain controller may calculate are time-dependent variables. As such, the first, second, third, and fourth component models are dynamic component models which are configurable to model a time variant system (i.e. configurable to model a non-steady state system).

The input file also includes information relating to the architecture of the specific powertrain. The input file comprises flow weight parameters and effort weight parameters. The flow weight parameters and effort weight parameters are used by the powertrain model to represent the connections between each of the components in the specific powertrain. As such, the model architecture is based on the flow weight parameters and effort weight parameters provided by the input file.

Generic Powertrain Component Library

Figure 5:
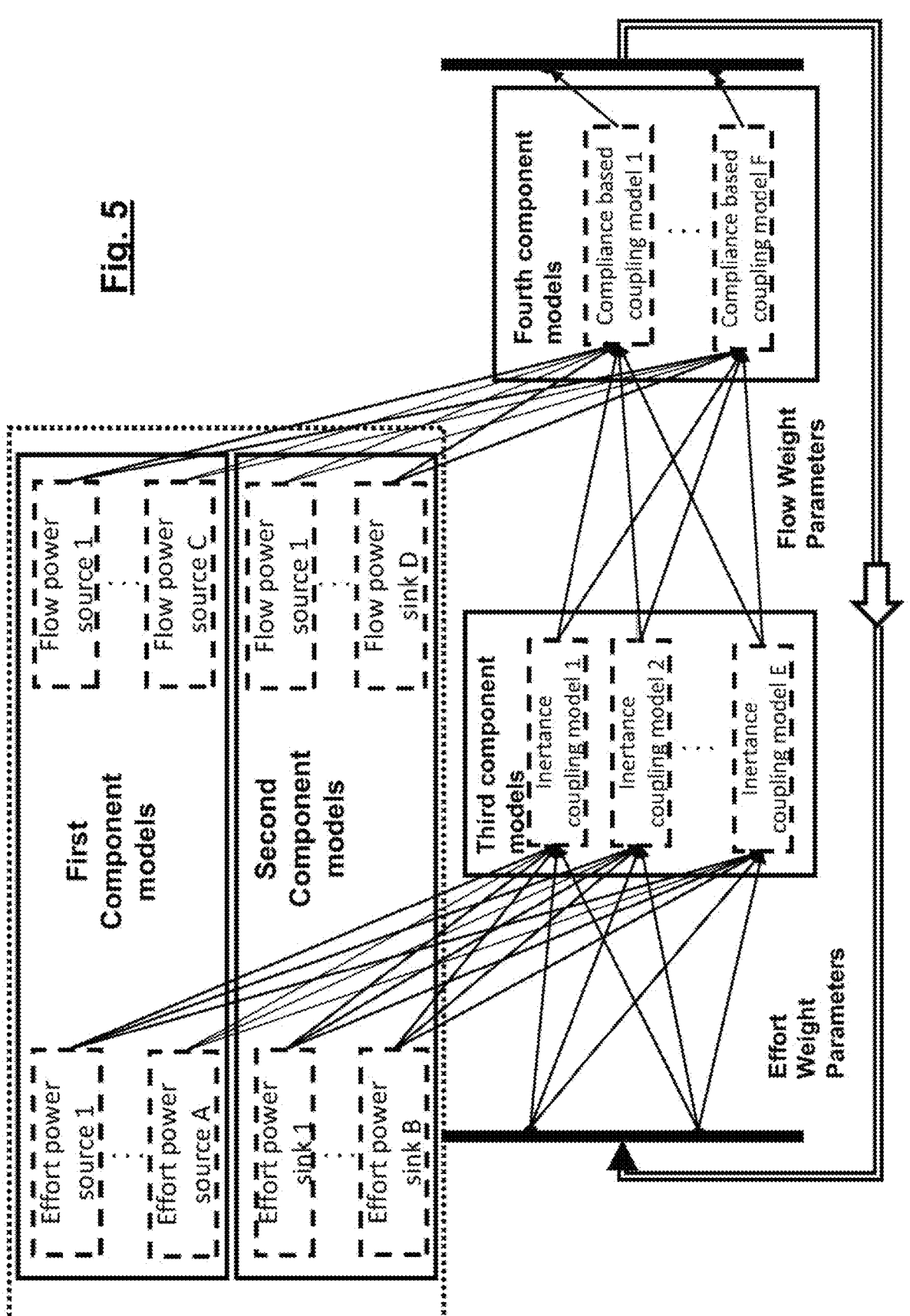
FIG. 5 shows a diagram of the generic powertrain component library and the connections that may be specified between each of the component models.

FIG. 5 shows a diagram of the generic powertrain component library and the connections that may be specified between each of the component models. As such, FIG. 5 provides a schematic diagram of the universal controller in a state prior to configuration with an input file.

FIG. 5 shows a representation of the first, second third, and fourth component models in the generic powertrain component library.

First Component Models

The first component models shown in FIG. 5 are configurable to represent flow power sources or effort power sources of a powertrain. As such, the configurable first component models comprise generic flow power source models and generic effort power source models which may be configured to represent specific power sources of a specific powertrain. As shown in FIG. 5, the generic powertrain component library may comprise A generic effort power source models and B generic flow power source models, where A and B are non-zero positive integers.

Each generic effort power source model is a generic model of a component which generates power in the form of an effort. Examples of an effort power source include an internal combustion engine generating a torque output, or a battery generating a voltage output. The generic powertrain component library includes one or more models for each generic component. That is to say, the generic powertrain component library may include a number of different models for a generic component (e.g. an internal combustion engine) from which the most appropriate model may be selected. For example, in one embodiment, the generic powertrain component library may comprise: a first generic internal combustion engine model, a second generic internal combustion engine model, a third generic internal combustion engine model, a first motor-generator model, a second motor-generator model, a first battery model, and a second battery model. In total, in the embodiment of FIG. 4, there are A generic effort power source models.

Each generic effort power source model of a component is configured to calculate an effort output for that component based on at least one component specific input provided to the controller. For example, for a generic internal combustion engine model, the generic internal combustion engine model may be configured to receive component specific inputs providing information relating to the variables Exhaust gas recirculation (EGR), Start of Injection (SOI), Fuel Rail Pressure (FRP), Shot Mode, Turbo Boost, and Engine Speed. A generic motor generator model may be configured to receive component specific inputs providing information relating to the variables: Current.

A number of generic component models for each type of effort power source wherein the component specific inputs utilised are different. Thus, the generic powertrain component library may be adapted to provide suitable models for a variety of different powertrains where a range of inputs are available to the universal controller.

In order to configure each generic effort power source model to reflect the performance of the specific effort power source to be modelled, each generic effort power source model may be configured to receive one or more first input parameters. The first input parameters provide information relating to the properties of each effort power source component in the specific powertrain. For example, for a generic internal combustion engine model, the model may be configured to receive first input parameters selected from a group including: Internal combustion engine efficiency parameters, Turbocharger control map parameters, Number of engine cylinders. The internal combustion engine efficiency parameters may include a range of different efficiency parameters depending on the internal combustion engine, for example including at least one of: Volumetric efficiency, gross fuel conversion efficiency, exhaust fuel conversion efficiency. For a generic motor generator model (e.g. representative of a DC motor), the model may be configured to receive first input parameters including: counter EMF constant ($k_b$), magnetic flux of the motor.

The generic flow power source models are generic models of a components which generate power in the form of a flow. Examples of flow power sources include a synchronous motor outputting a constant angular velocity, a massive body travelling at a constant speed, water flow for driving a hydro-electric generator, or a hydraulic pump outputting a constant fluid flow. The generic powertrain component library includes one or more models for each generic flow power source component. That is to say, the generic powertrain component library may include a number of different models for a generic flow power source component (e.g. a synchronous motor) from which the most appropriate model may be selected.

Each generic flow power source model of a component is configured to calculate a flow output for that component based on at least one component specific input provided to the controller. For example, a generic synchronous motor model may be configured to receive a component specific input providing information relating to the variable: AC current frequency, from which the flow output may be calculated. Similar to the effort power source models described above, a number of generic component models may be provided for each type of flow power source wherein the component specific inputs utilised are different. Thus, the generic powertrain component library may be adapted to provide suitable models for a variety of different powertrains where a range of inputs are available to the universal controller.

In order to configure each generic flow power source model to reflect the performance of the specific effort power source to be modelled, each generic flow power source model may be configured to receive one or more first input parameters. The first input parameters provide information relating to the properties of each flow power source component in the specific powertrain. For example, for a hydraulic pump, first input parameters including volumetric efficiency, and the stroked volume of the hydraulic pump may be provided by the input file.

The configurable first component models in the generic powertrain component library comprise a variety of different models of various power source which may be used in a range of different powertrains. By providing a range of different generic power source models, the universal controller can be configured to control a wide range of different powertrains. Furthermore, as each configurable first component model is arranged to receive first input parameters, each first component model can be configured to accurately model the behaviour of the specific power source to be modelled.

For example, in one embodiment an input file may be provided to the controller comprising first input parameters which define a specific powertrain with $N_1$ power sources, where $N_1$ is a positive non-zero integer. The $N_1$ power sources of the specific powertrain include $A_1$ effort power sources and $B_1$ flow power sources, where $A_1$ and $B_1$ are both non-negative integers. Examples in which the universal controller is configured to model a specific powertrain are discussed in more detail below.

Second Component Models

The second component models shown in FIG. 5 are configurable to represent flow power sinks or effort power sinks of a powertrain. As such, the configurable second component models comprise generic flow power sink models and generic effort power sink models which may be configured to represent specific power sources of a specific powertrain. As shown in FIG. 5, the generic powertrain component library may comprise C generic effort power sink models and D generic flow power sink models, where C and D are non-zero positive integers.

The generic effort power sink models and generic flow power sink models are models of components which generally consume power. It will be appreciated that there are some components, for example a motor-generator, which may consume or generate power and as such may interchangeably act as a power source or power sink. Such components may be modelled in the generic component library as a first component model, a second component model, or both. When configuring a model of a specific powertrain, a component is considered to be a power source or power sink based on its dominant use case. That is to say, components which act as power sources for the majority of time are considered to be power sources. Components which act as power sinks for the majority of time are considered to be power sinks.

Each generic effort power sink model is a generic model of a component which consumes power in the form of an effort. Examples of an effort power sink include the drive output of a vehicle (e.g. wheels in contact with the ground), or a motor-generator. The generic powertrain component library includes one or models for each generic component. That is to say, the generic powertrain component library may include a number of different models for a generic component (e.g. a drive output) from which the most appropriate model may be selected. For example, in one embodiment, the generic powertrain component library may comprise: a first generic drive model, a second generic drive model, a third generic drive model, a first motor-generator model, a second motor-generator model. In total, in the embodiment of FIG. 4, there are C generic effort power sink models.

Each generic effort power sink model of a component is configured to calculate an effort output for that component based on at least one second component specific input provided to the universal controller. As the specific power sink will often be consuming power, the effort output calculated by the generic effort power sink model may be negative. For example, for a generic drive model of a vehicle, the generic drive model may be configured to receive component specific inputs providing information relating to the variables: vehicle speed, wind resistance, and gradient. A generic motor generator model may be configured to receive second component specific inputs providing information relating to the variables: current output, voltage output.

A number of generic effort power sink models may be provided for each type of effort power sink. Thus, each type of effort power sink may be modelled using different component specific inputs. Thus, the generic powertrain component library may be adapted to provide suitable models for a variety of different effort power sinks where a range of second component specific inputs are available to the universal controller.

In order to configure each generic effort power sink model to reflect the performance of the specific effort power sink to be modelled, each generic effort power sink model may be configured to receive one or more second input parameters. The second input parameters provide information relating to the properties of each effort power sink component in the specific powertrain. For example, for a generic drive model, the model may be configured to receive first input parameters selected from a group including: drive efficiency, coefficient of friction etc. For a generic motor generator model (e.g. representative of a DC motor), the model may be configured to receive first input parameters including: counter EMF constant ($k_b$), magnetic flux of the motor.

The generic flow power sink models are generic models of components which consume power in the form of a flow. Examples of flow power sinks include the national grid, which receives electrical power at a generally constant frequency. The generic powertrain component library includes one or more models for each generic flow power sink component. That is to say, the generic powertrain component library may include a number of different models for a generic flow power sink component (e.g. the national grid) from which the most appropriate model may be selected.

Each generic flow power sink model of a component is configured to calculate a flow output for that component based on at least one second component specific input provided to the controller. For example, for a generic national grid model, the generic national grid model may be configured to receive a component specific input providing information relating to the variable: AC current frequency, from which the flow output may be calculated. Similar to the effort power sink models described above, a number of generic component models may be provided for each type of flow power sink wherein the component specific inputs of the second component specific inputs utilised are different. Thus, the generic powertrain component library may be adapted to provide suitable models for a variety of different powertrains where a range of inputs are available to the universal controller.

In order to configure each generic flow power sink model to reflect the performance of the specific flow power sink to be modelled, each generic flow power sink model may be configured to receive one or more second input parameters.

The second input parameters provide information relating to the properties of each flow power sink component in the specific powertrain.

The configurable second component models in the generic powertrain component library comprise a variety of different models of various power sinks which may be used in a range of different powertrains. By providing a range of different generic power sink models, the universal controller can be configured to control a wide range of different powertrains. Furthermore, as each configurable second component model is arranged to receive second input parameters, each second component model can be configured to accurately model the behaviour of the specific power source to be modelled.

For example, in one embodiment an input file may be provided to the controller comprising second input parameters which define a specific powertrain with $M_1$ power sinks, where $M_1$ is a positive non-zero integer. The $M_1$ power sinks of the specific powertrain include $C_1$ effort power sinks and $D_1$ flow power sinks, where $C_1$ and $D_1$ are both non-negative integers. Examples in which the universal controller is configured to model a specific powertrain are discussed in more detail below.

Third Component Models

The third and fourth component models shown in FIG. 5 provide a plurality of generic coupling models which may be configured to model one or more couplings of a specific powertrain. In general, a coupling of a specific powertrain links two components of a powertrain together. The causality of the coupling is reflected by the type of model chosen to represent the coupling. Accordingly, a coupling of a specific powertrain may either be modelled as an inertance coupling (i.e. an inertance coupling model), or a compliance based coupling (i.e. a compliance based coupling model). Inertance coupling models are model which include an inertance parameter associated with the coupling. Inertance coupling models take one or more effort inputs, and determine a resultant flow output. Compliance based coupling models are models which include compliance parameter with the coupling. Compliance based coupling models receive one or more flow inputs and calculate a resultant effort output.

The third component models shown in FIG. 5 are configurable to represent inertance couplings. As shown in FIG. 5, the generic powertrain component library may comprise E generic inertance coupling models, where E is a non-zero, positive integer.

Each generic inertance coupling model is a generic model of a coupling in a powertrain where an effort is provided to cause a flow. Examples of an inertance coupling include a flywheel in the angular mechanical domain, or a vehicle mass in the linear mechanical domain.

The generic powertrain component library includes one or models for each generic inertance coupling. That is to say, the generic powertrain component library may include a number of different models for a generic inertance coupling from which the most appropriate model may be selected. For example, in one embodiment, the generic powertrain component library may comprise: a first generic inertance coupling model, a second generic inertance coupling model, a third generic inertance coupling model etc. In total, in the embodiment of FIG. 5, there are E generic inertance coupling models.

Each generic inertance coupling model is configured to calculate a flow output for the coupling based at least one effort input. As show in FIG. 5, the effort input to an inertance coupling model may be provided by specifying a connection between the inertance coupling model and any of the A effort power source models, any of the C effort power sink models and any of the F compliance based coupling models. Prior to the configuration of the universal controller, no connections are specified between the inertance coupling models and the effort outputs of the effort power source models, effort power sink models, and the compliance based coupling models. When the universal controller is configured for a specific powertrain, connections may be specified between at least one inertance coupling model and the effort outputs by the connection parameter module. The connection parameter module is discussed in more detail below.

A number of generic inertance coupling models for each type of inertance coupling may be provided in the generic powertrain component library. Thus, the generic powertrain component library may be adapted to provide suitable models for a variety of different powertrains with a range of different architectures.

In order to configure each generic inertance coupling model to reflect the performance of the specific inertance coupling to be modelled, each generic inertance coupling model may be configured to receive one or more third input parameters. The third input parameters provide information relating to the properties of each inertance coupling in the specific powertrain. In some cases, the inertance coupling may also reflect further properties of the powertrain architecture, depending on the specific components of the powertrain connected together by, or represented by, the inertance coupling model.

Figure 6A:
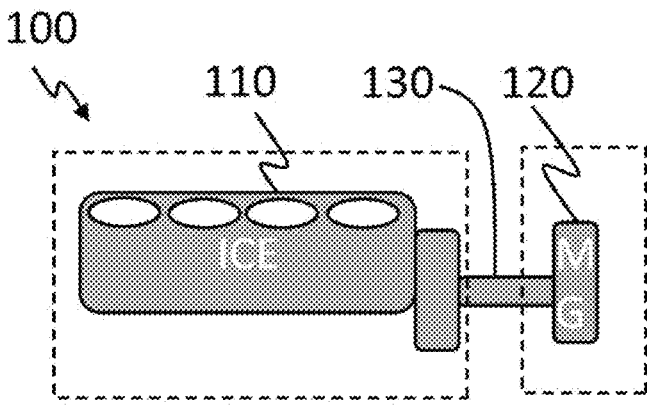
FIG. 6A shows a schematic diagram of a first powertrain according to this disclosure

For example, FIG. 6A shows a diagram of a generator 100 comprising an internal combustion engine 110, a motor generator 120, and a drive shaft 130. The generator 100 is an example of a (first) specific powertrain according to this disclosure. The architecture of the generator 100 comprises the internal combustion engine 110 which is connected to the motor generator 120 by the drive shaft 130. The internal combustion engine 110 is configured to generate a torque which is transferred via drive shaft 130 to drive the motor generator 130 in order to generate electrical power. Accordingly, the internal combustion engine 110 sources an effort (torque) which acts on the drive shaft and the motor generator sinks an effort (torque) from the drive shaft. As such, there are two effort inputs to the drive shaft.

In the example, of FIG. 6A, the inertia associated with internal combustion engine 110, and the inertia associate with the motor-generator 120 are both significantly greater than the inertia associated with the drive shaft 130. The drive shaft 130 may also be assumed to be rigid such that any compliance associated with the drive shaft is assumed to be negligible for the purposes of the model. Thus, in some generic inertance coupling models, the inertias of the internal combustion engine 110 and the motor generator 120 may be lumped into a single body, and modelled as a single inertia of the inertance coupling. The assumption that the drive shaft 130 is a rigid drive shaft means that there is no compliance associated with the drive shaft and thus the powertrain does not include any compliance based coupling components. For example, in some powertrains where the drive shaft 130 is relatively short, this approximation is reasonable in order to simplify the model.

Figure 7:
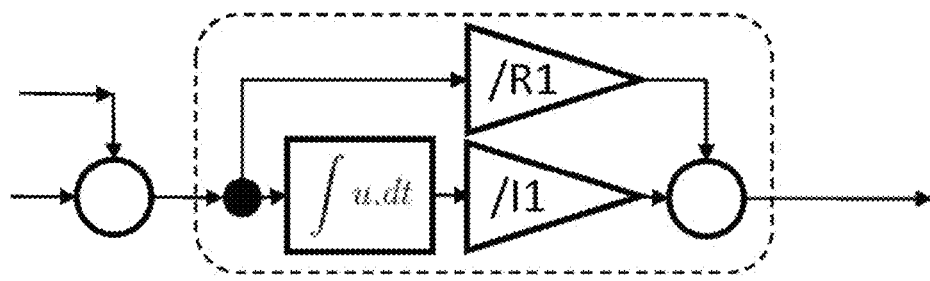
FIG. 7 shows a block diagram of one example of a generic linear inertance coupling model.

FIG. 7 shows a block diagram of an example of a generic inertance coupling model, which is a generic linear inertance coupling model. The block diagram of FIG. 7 may be used to model the lumped inertias of the internal combustion engine 110 and motor generator 120 of FIG. 6A as a linear inertance coupling. As shown in FIG. 7, the generic linear inertance coupling model is configurable to receive a plurality of effort outputs. For example, the generic inertance coupling model may be configured to receive effort outputs from an effort power source model representative of the internal combustion engine 110 and an effort power sink model representative of the motor-generator 120. The generic linear inertance coupling model is a linear model as the flow output is calculated through a linear equation (integration). Of course, the third coupling models may also include other generic inertance coupling models which are non-linear (i.e. a generic non-linear inertance coupling model).

As shown in the generic linear inertance coupling model of FIG. 7, a first effort sum junction is provided. The first effort sum junction is configurable to calculate a net effort input for the generic inertance coupling model based on the effort outputs provided to it (i.e. at least one of: the effort output from one or more power source models, the effort output from one or more power sink models, and the effort output from one or more compliance based coupling models). As shown in FIG. 7, the flow output is calculated based on the net effort input calculated by the first effort sum junction.

In order to accurately model the drive shaft 130 of FIG. 6A, the generic linear inertance coupling model is also configured to receive third input parameters. The third input parameters may include information relating to an inertance for the coupling (i.e. an inertance parameter I1). In the generator 100 of FIG. 6A, the inertance parameter may be based on the combined inertias of the internal combustion engine 110 and the motor-generator 120.

In some embodiments, the third input parameters may include a first resistance parameter. In some embodiments, a resistance parameter may be provided to the generic inertance coupling model to adapt the model to a component based on a resistance. For example, in the electrical domain a circuit comprising a resistor and a capacitor (but no inertance) may be modelled using by the inclusion of a generic inertance coupling model comprising a resistance parameter.

As shown in FIG. 7, the flow output of the generic inertance coupling model is calculated in accordance with the tetrahedron of state. For the generator 100 of FIG. 6A, the inertance coupling model would be configured to calculate an angular velocity output (e.g. revolutions per minute) of the drive shaft.

Fourth Component Models

As shown in FIG. 5, the generic powertrain component library also includes fourth component models. The fourth component models The fourth component models shown in FIG. 5 are configurable to represent compliance based couplings. As shown in FIG. 5, the generic powertrain component library may comprise F generic compliance based coupling models, where E is a non-zero, positive integer.

Each generic compliance based coupling model is a generic model of a coupling in a powertrain where a flow is provided to cause an effort. Examples of a compliance based coupling include a drive shaft connecting synchronous motor to a propeller.

Similar to the generic inertance coupling models discussed above, the generic powertrain component library includes one or models for each generic compliance based coupling. That is to say, the generic powertrain component library may include a number of different fourth component models for a generic compliance based coupling from which the most appropriate model may be selected. For example, in one embodiment, the generic powertrain component library may comprise: a first generic compliance based coupling model, a second generic compliance based coupling model, a third generic compliance based coupling model etc. In total, in the embodiment of FIG. 5, there are F generic compliance based coupling models.

Each generic compliance based coupling model is configured to calculate an effort output for the coupling based at least one flow input. As show in FIG. 5, the flow input to a compliance based coupling model may be provided by specifying a connection between the compliance based coupling model and any of the B flow power source models, any of the D flow power sink models and any of the E inertance coupling models. Prior to the configuration of the universal controller, no connections are specified between the compliance based coupling models and the flow outputs of the flow power source models, the flow power sink models, and the inertance coupling models. When the universal controller is configured for a specific powertrain, connections may be specified between at least one the effort outputs and the generic compliance based coupling model by the connection parameter module. The connection parameter module is discussed in more detail below.

A number of generic compliance based coupling models for each type of compliance based coupling may be provided in the generic powertrain component library. Thus, the generic powertrain component library may be adapted to provide suitable models for a variety of different powertrains with a range of different architectures.

In order to configure each generic compliance based coupling model to reflect the performance of the specific compliance based coupling to be modelled, each generic compliance based coupling model may be configured to receive one or more fourth input parameters. The fourth input parameters provide information relating to the properties of each compliance based coupling in the specific powertrain. In some cases, the compliance based coupling may also reflect further properties of the powertrain architecture, depending on the specific components of the powertrain connected together by the inertance coupling. For example, in some embodiments, the fourth input parameters may include a compliance parameter for the compliance based coupling. In some embodiments, the fourth input parameters may include a second resistance parameter. As such, a generic compliance based coupling model may be adapted to model a resistive component. The compliance based coupling models of the fourth component models are discussed in further detail with reference to the Synchronous AC Motor powertrain 200 below.

In general, the third and fourth component models of the generic component library allow the universal controller to be configured to model a specific powertrain comprising X couplings. For example, in one embodiment an input file may be provided to the controller comprising third and fourth input parameters which define a specific powertrain with $X_1$ couplings, where $X_1$ is a positive non-zero integer. The $X_1$ couplings of the specific powertrain include $Y_1$ inertance couplings and $Z_1$ compliance based couplings, where $Y_1$ and $Z_1$ are both non-negative integers. Examples in which the universal controller is configured to model a specific powertrain are discussed in more detail below.

Connection Parameter Module

FIG. 5 also shows a representation of the possible interconnections that may be defined by the effort and flow weight parameters in order to define a model architecture. The connections between the component models fall into one of two groups: flow connections or effort connections.

Flow connections may connect a flow output of one of the first, second or third component models to a flow input of a fourth component model. As such, a flow connection may connect a flow output of a generic flow power source model, a flow output of a generic flow power sink model, or a flow output of a generic inertance coupling model to a flow input of a generic compliance based coupling mode. Effort connections may connect an effort output of one of the first, second or fourth component models to an effort input of a third component model. As such, an effort connection may connect an effort output of a generic effort power source model, an effort output of a generic effort power sink model, or an effort output of a generic compliance based coupling model to an effort input of a generic inertance coupling mode.

In FIG. 5, the possible effort connections between E generic inertance coupling models and the A generic effort power source models, C generic effort power sink models, the F compliance based couplings models are shown. FIG. 5 also shows the possible flow connections between the F generic compliance based coupling models and the B generic flow power source models, D generic flow power sink models, the E inertance coupling models. As such, prior to the configuration of the universal controller with the input file, the universal controller is configurable to model substantially any possible powertrain architecture using the connection parameter module.

The connection parameter module is configurable to define a model architecture which is representative of the powertrain architecture of a specific powertrain. As such, the connection parameter module is configured to specify the connections between the N power source models, M power sink models and X coupling models configured from the generic powertrain component library. The connection parameter module specifies the connections based on flow weight parameters and effort weight parameters provided by the input file. As such, the connection parameter module determines a model architecture which is representative of the powertrain architecture based on flow weight parameters and effort weight parameters of the input file.

The flow weight parameters define the flow connections from the flow outputs of the N power source models (i.e. the flow outputs from any flow power source models), the flow outputs of the M power sink models (i.e. the flow outputs from any flow power sink models), and the flow outputs of the inertance coupling models of the X couplings to the flow inputs of the compliance based coupling models of the X couplings of the model architecture. That is to say the flow weight parameters define which of the possible flow connections of the universal controller are present in the model architecture.

The effort weight parameters define the effort connections from the effort outputs of the N power source models, the effort outputs of the M power sink models, and the effort outputs of the compliance based coupling models of the X couplings to the effort inputs of the inertance coupling models of the X coupling models of the model architecture. That is to say the effort weight parameters define which of the possible effort connections of the universal controller are present in the model architecture.

Accordingly, universal controller may be configured to provide a powertrain model which models a specific powertrain based on the N power source models, M power sink models, X coupling models, and the model architecture. It will be appreciated from FIG. 5 that all of the interconnections between the generic powertrain component models of the generic powertrain component library are present in the universal controller prior to configuration. As such, the universal controller may be implemented using a pre-compiled computer program stored in a memory. The pre-compiled computer program may be executed on a processor to provide a controller for a specific powertrain on receipt of an input file providing the input parameters discussed above. The skilled person will appreciate that such a universal controller is possible because due to the functionality of the generic powertrain component library and the connection parameter module. Specifically, the universal controller is configurable to model a specific powertrain without being re-compiled as the first, second, third, and fourth component models and the connection parameter module are configurable based on input parameters from an input file. As such, the universal powertrain controller is configurable (and reconfigurable) to model a wide range of powertrains without the need to re-compile the universal controller.

In addition to the configurable powertrain model, the universal controller may also comprise additional control modules for controlling a powertrain. It will be appreciated that various model-based control schemes for a powertrain (or indeed any dynamic system) comprise a model of the powertrain to be controlled (i.e. a plant model). Thus, the universal controller of the present disclosure may incorporate various other control modules, in order to control the powertrain. In some embodiments, the universal controller may be arranged to provide a model of the specific powertrain to another control device associated with the specific powertrain.

For example, in some embodiments, the universal controller may be provided to control one or more actuator setpoints of a specific powertrain. The universal controller may control the actuator setpoints based on the powertrain model provided by the universal controller. The universal controller may also comprise an optimiser module. The optimiser module may be configured to calculate one or more optimised setpoints for actuator setpoints based on the powertrain model of the universal powertrain controller. That is to say, the optimiser module may use to the powertrain module to determine optimised setpoints in order to control a specific powertrain.

It will be appreciated that the above example of a universal controller including an optimiser module is only one possible application of the configurable powertrain model of the universal controller. Indeed, the configurable powertrain model of the universal controller may be applied to various model-based control schemes.

Specific Configurations of the Universal Powertrain Controller

Next, various examples of possible applications of the universal controller to specific powertrains will be discussed. It will be appreciated that the following examples of possible configurations of the universal controller are non-limiting, and that other configurations of the universal controller will be readily apparent to the skilled person.

Generator Example

Figure 8A:
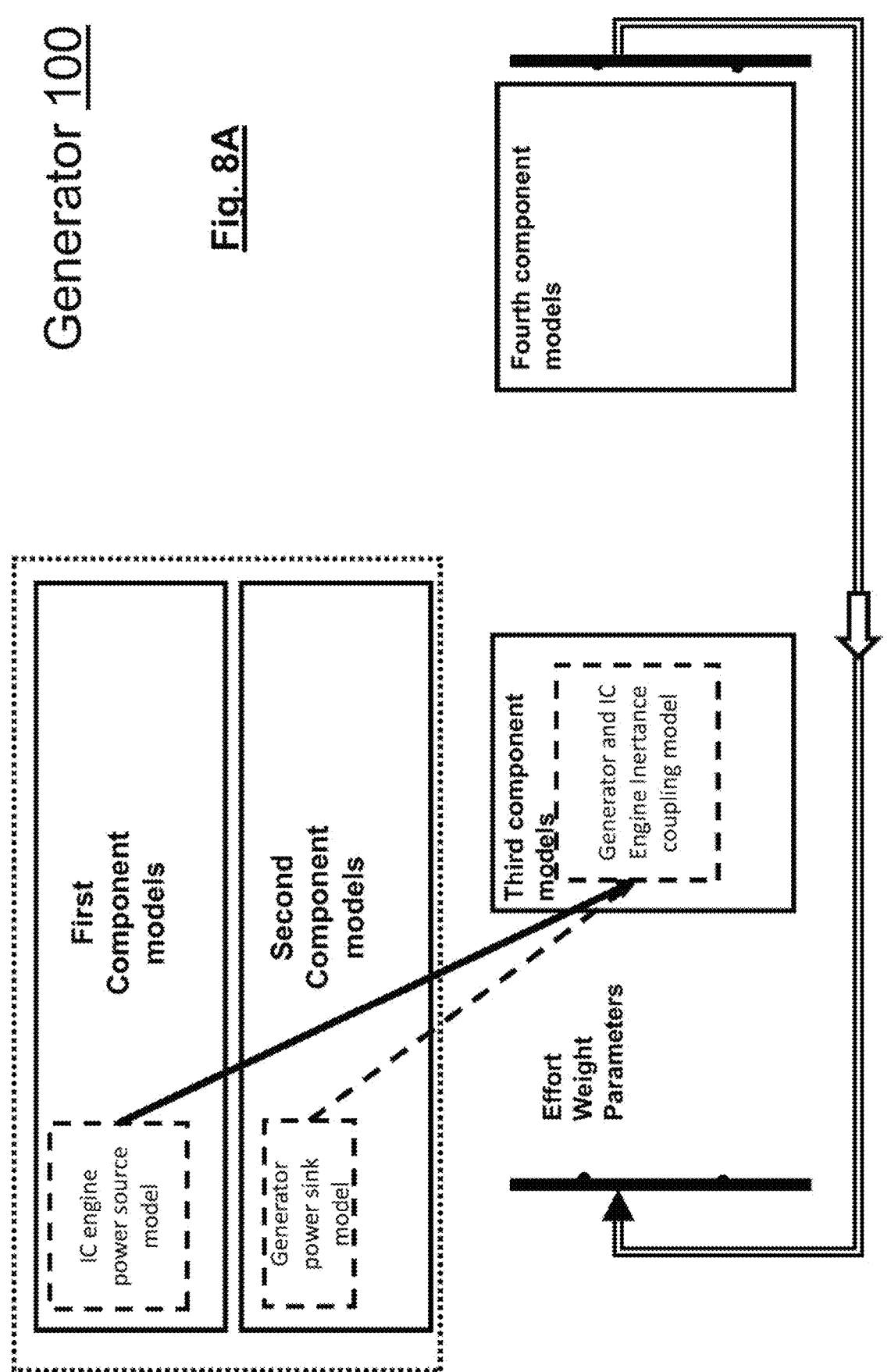
FIG. 8A shows a diagram of the one possible configuration of the universal controller to provide a powertrain model of the first powertrain.

FIG. 8A shows a schematic diagram of a universal controller which has been configured to control a generator 100. As such, the configurable powertrain model of the universal controller is configured to model the generator 100 shown in FIG. 6A. The configuration of the configurable powertrain model is shown with respect to the diagram of FIG. 5. As such, FIG. 8A shows the component models and connections which are utilised in the configurable powertrain model following configuration by a suitable input file for the generator 100.

As discussed above, the generator 100 comprises one internal combustion engine 110 which outputs a torque to drive the motor generator 120. As such, the specific powertrain comprise one effort power source (N=1). The motor generator 120 acts as a power sink in this specific powertrain, and receives a torque. As such, the specific powertrain comprises one effort power sink (M=1). The internal combustion engine 110 and the motor generator 120 are connected by a drive shaft 130 (assumed to be rigid), allowing the inertance bodies 110 and 120 to be modelled as a single lumped inertance. As such, the specific powertrain comprises one coupling, which is an inertance coupling (X=1, Y=1).

The input file which provides the input parameters to configure the model as shown in FIG. 8A. As such, the input file provides first, second and third input parameters based on the components of the specific powertrain (N=1, M=1, X=1, Y=1) discussed above. As the specific powertrain does not include a compliance based coupling, no fourth input parameters are required. As such, it will be appreciated that FIG. 8A only shows the models of the configurable powertrain model which are utilised in the configured powertrain model of the specific powertrain.

The connection parameter module defines the connections between the models shown in FIG. 8A. In this specific powertrain, the architecture of the specific powertrain is relatively simple, and so only effort connections are used to model the specific powertrain. The effort connections are specified by the effort weight parameters of the input file.

Accordingly, the diagram of FIG. 8A shows how the universal controller (e.g. as shown in FIG. 5) may be configured to provide a powertrain model of a generator 100.

Figure 6B:
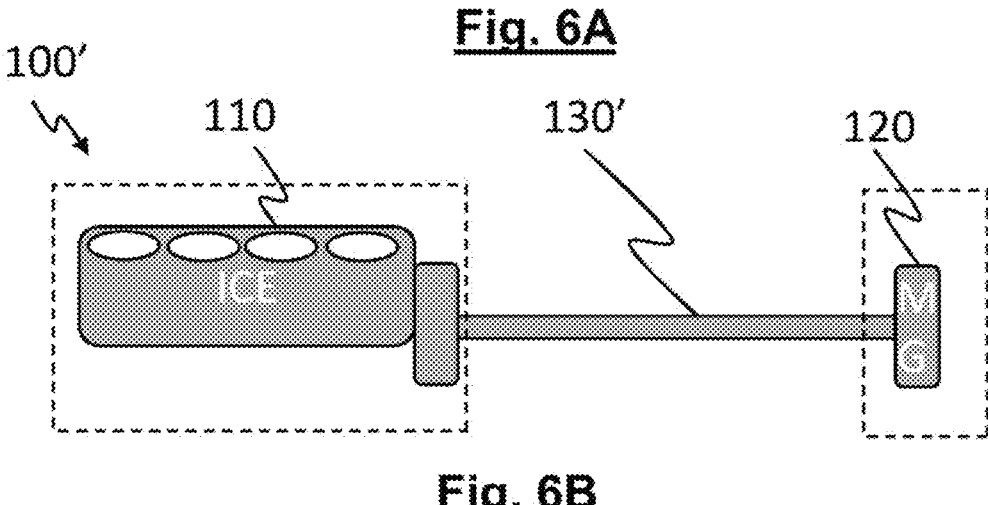
FIG. 6B shows a further schematic diagram of a generator powertrain with a non-rigid drive shaft.

As discussed above, in the example of FIG. 6A the rigid drive shaft 130 is considered to be a rigid body, and as such there is assumed to be no significant compliance associated with drive shaft 130. For example, as shown in FIG. 6A the drive shaft 130 is relatively short. FIG. 6B shows a further example of a generator 100' in which the drive shaft 130' is relatively long (relative to the drive shaft 130 of FIG. 6A). In such an example, the drive shaft 130' may have a compliance associated with it which it is desirable to account for in the configurable powertrain model. In order to account for the compliance of the drive shaft, the inertances associated with the internal combustion engine 110 and the motor generator 120 are modelled separately. Accordingly, component models for two inertance couplings (Y=2) and one compliance based coupling (Z=1) will need to be configured from the generic powertrain component library (X=3).

Figure 8B:
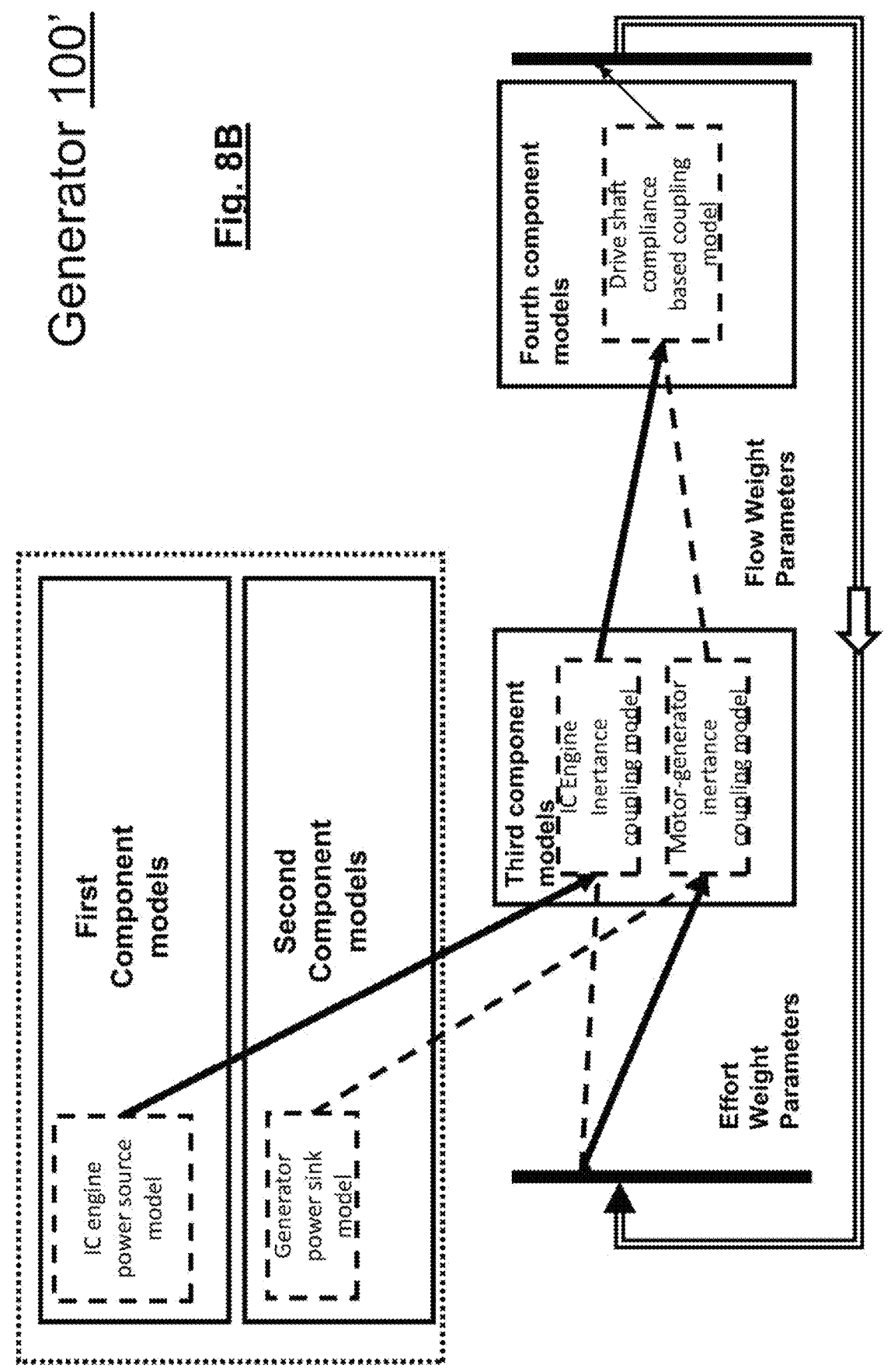
FIG. 8B shows a further diagram of another possible configuration of the universal controller to provide a powertrain model of the first powertrain where the drive shaft is assumed to not be rigid.

Accordingly, the diagram of FIG. 8B shows how the universal controller (e.g. as shown in FIG. 5) may be configured to provide a powertrain model of a generator 100' where the compliance of the drive shaft 130' is taken into account in the model. It will be appreciated that the degree to which the universal controller makes assumptions about the performance of the various components of a powertrain will depend on the desired fidelity of the powertrain model to be provided by the universal controller.

Synchronous AC Motor Drive Example

Figure 9:
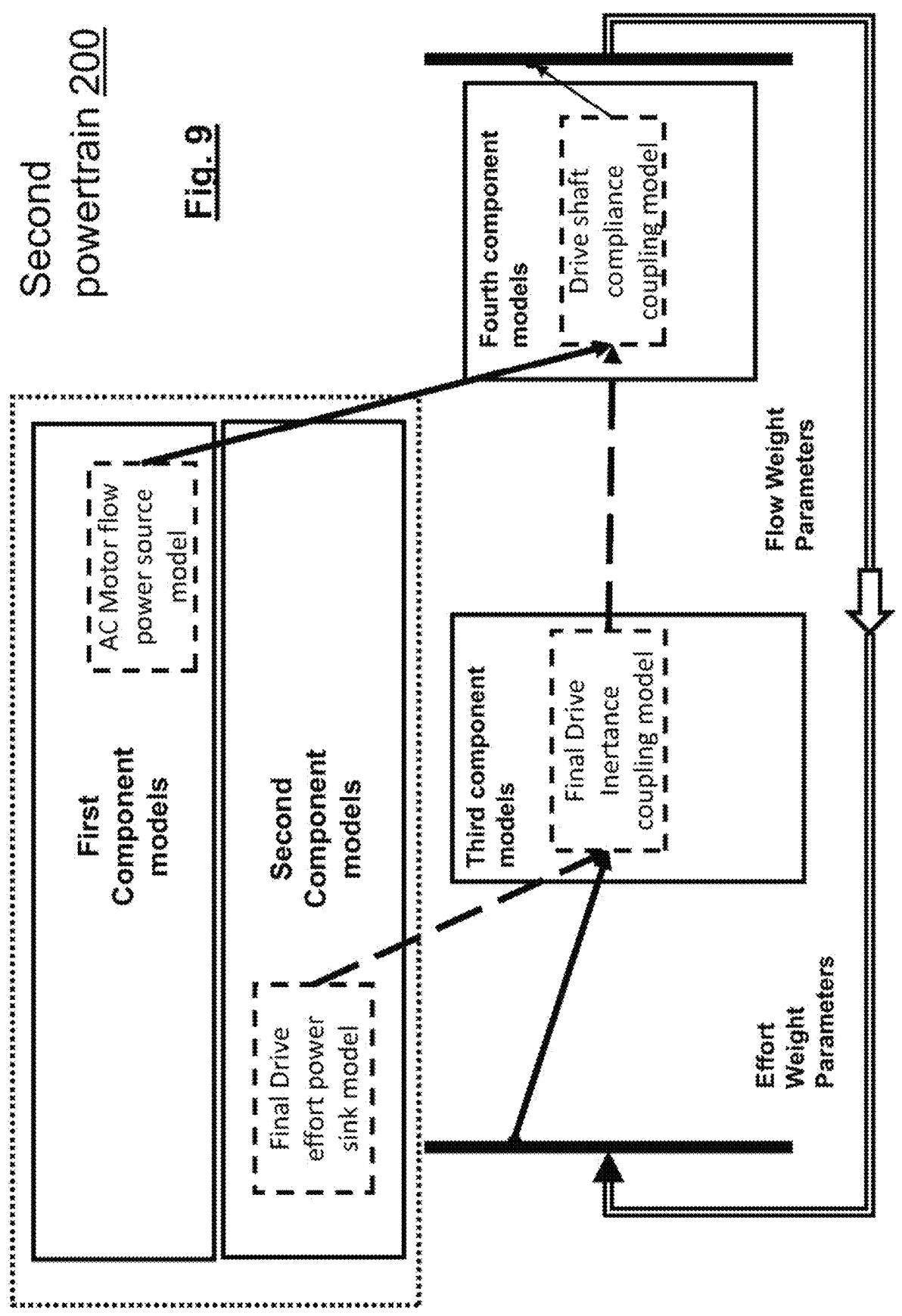
FIG. 9 shows a diagram of the universal controller configured to provide a powertrain model of the second powertrain.
Figure 10:
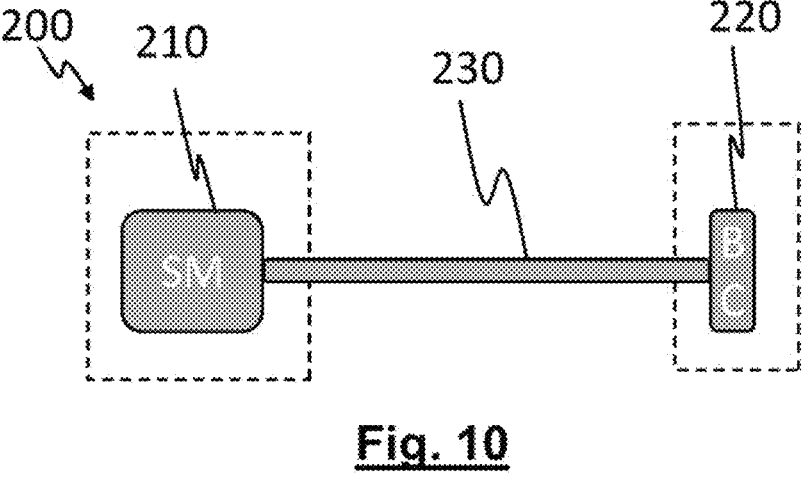
FIG. 10 shows a schematic diagram of a second powertrain according to this disclosure.

FIG. 9 shows a schematic diagram of a universal controller which has been configured to control a second powertrain 200 comprising a synchronous AC motor 210 direct driving a load 220. The synchronous AC motor 210 is coupled to the load by a driveshaft 230. A diagram of such a powertrain is shown in FIG. 10.

The second powertrain 200 comprises a synchronous motor 210. The synchronous motor rotates with an angular velocity which is based on the frequency of the AC power supply to the synchronous motor (e.g. 50 Hz). As such, the synchronous AC motor 210 is a flow based power source which outputs a constant flow (angular velocity). The synchronous AC motor 210 is connected to a load 220 by a driveshaft 230. The load 220 may be some machinery, (i.e. some form of inertance body) which is driven by a torque.

Accordingly, the second powertrain 200 comprises one flow power source (N=1). The load 220 acts as a power sink in this specific powertrain, and receives a torque. As such, the specific powertrain comprises one effort power sink (M=1). The load 220 also has an inertia associated with it. Accordingly, at least one inertance coupling should be included in the powertrain model to account for the load inertia (Y=1). The AC synchronous motor 210 and the load 220 are connected by a drive shaft 230. The drive shaft receives the flow output from the synchronous motor 210 and applies a torque to the load 220. Accordingly, the drive shaft 230 may be modelled as a compliance based coupling (Z=2). Thus, in the second powertrain 200, two coupling models are present (X=2).

Figure 11:
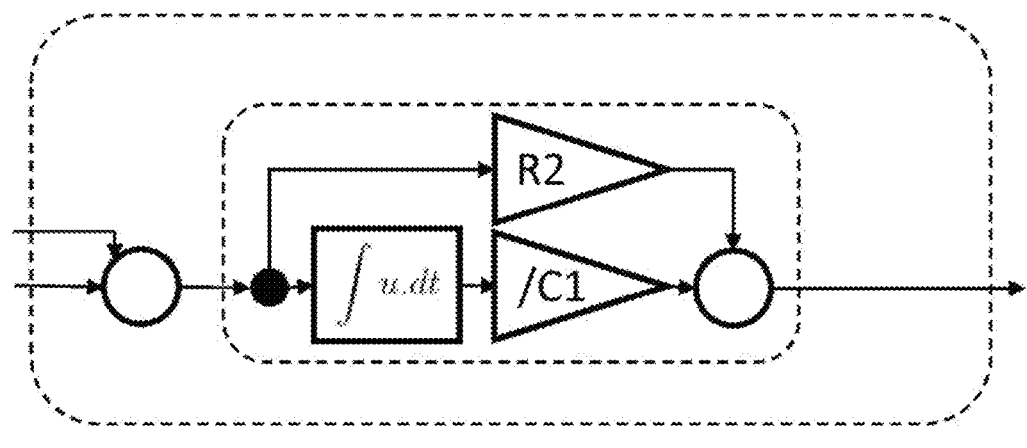
FIG. 11 shows a block diagram of one example of a generic linear compliance based coupling model.

An example of a block diagram of a generic compliance based coupling model is shown in FIG. 11. The block diagram of FIG. 11 may be used to model the drive shaft 230 of FIG. 10 as a compliance based coupling. As shown in FIG. 11, the generic compliance based coupling model is configurable to receive a plurality of flow outputs as flow inputs to the model. For example, the generic compliance based coupling model may be configured to receive flow outputs from a flow power source model representative of the synchronous AC motor 210 and a flow output from the inertance coupling model of the drive inertia.

As shown in the generic compliance based coupling model of FIG. 11, a first flow sum junction is provided. The first flow sum junction is configurable to calculate a net flow input for the generic compliance based coupling model based on the flow outputs provided to it (i.e. at least one of: the flow output from one or more power source models, the flow output from one or more power sink models, and the flow output from one or more inertance coupling models). As shown in FIG. 11, the flow output is calculated based on the net effort input calculated by the first flow sum junction.

In order to accurately model the drive shaft 230 of FIG. 10, the generic compliance based coupling model is also configured to receive fourth input parameters. The fourth input parameters may include information relating to a compliance for the coupling (i.e. a compliance parameter C1). In the second powertrain 200 of FIG. 10, the compliance parameter may be based on the combined compliance of the synchronous AC motor 210 and the drive shaft 230.

The fourth input parameter may also include information relating to a resistance for the coupling (i.e. a second resistance parameter R2). The resistance term provides an option to configure the generic compliance based coupling based on a resistance term, rather than a compliance term.

The generic compliance based coupling model shown in FIG. 11 is a generic linear compliance based coupling model. As shown in FIG. 11, the effort output may be calculated from the net flow input by integrating the net flow input and scaling by the inverse of the compliance parameter C1. Of course, it will be appreciated that the generic linear compliance based coupling model shown in FIG. 11 is only one example of a possible generic compliance based coupling model. For example, in other embodiments, the generic powertrain component library may include fourth component models which are generic non-linear compliance based component models. Various types of dynamic models of components are well known to the skilled person.

The input file provides the input parameters to configure the model as shown in FIG. 9. As such, the input file provides first, second, third, and fourth input parameters based on the components of the specific powertrain (N=1, M=1, X=2, Y=1, Z=1) as discussed above. Similar to FIGS. 8A and 8B, FIG. 9 only shows the models of the configurable powertrain model which are utilised in the configured powertrain model of the second powertrain 200.

Figure 12:
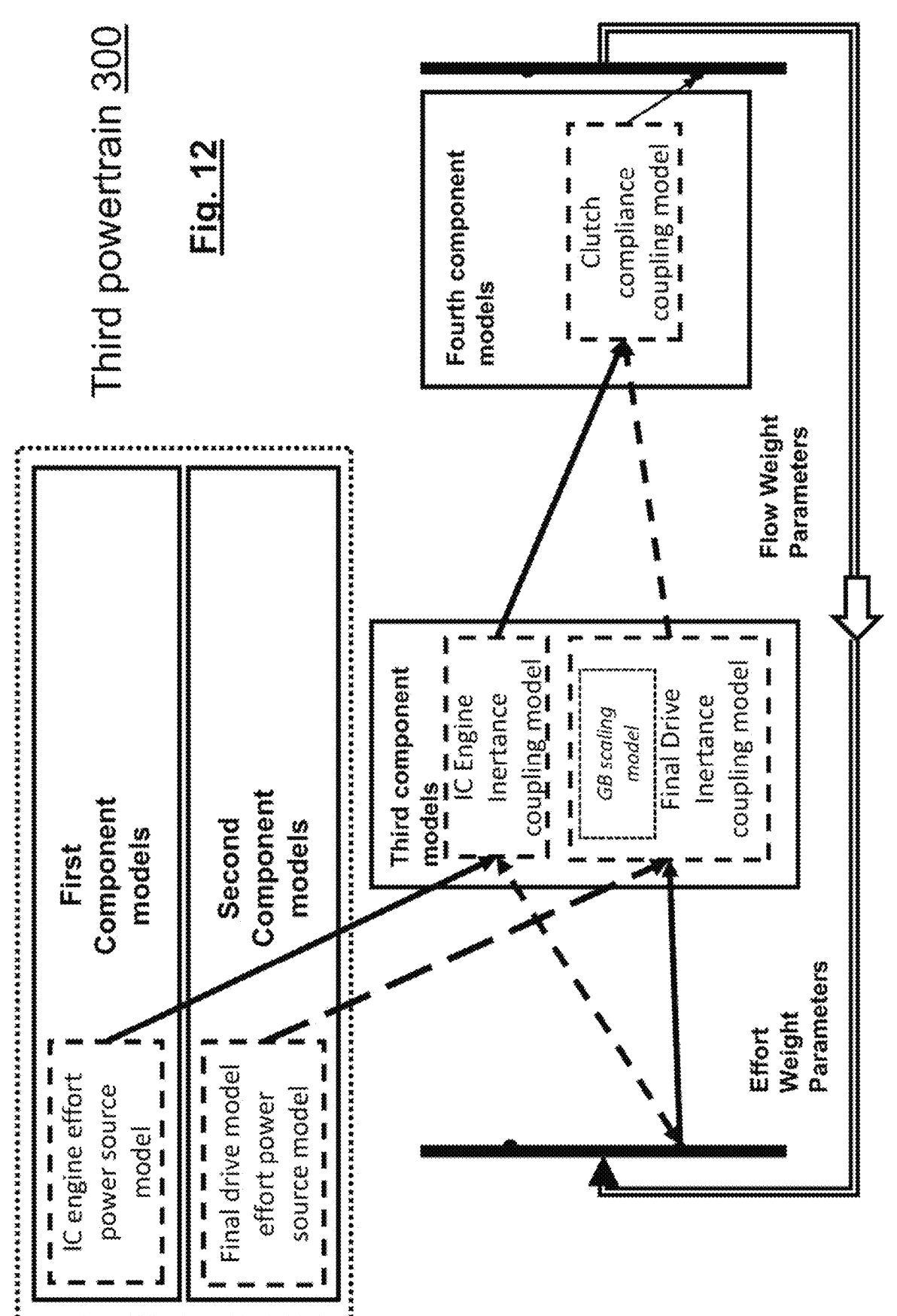
FIG. 12 shows a diagram of the universal controller configured to provide a powertrain model of the third powertrain.
Figure 13:
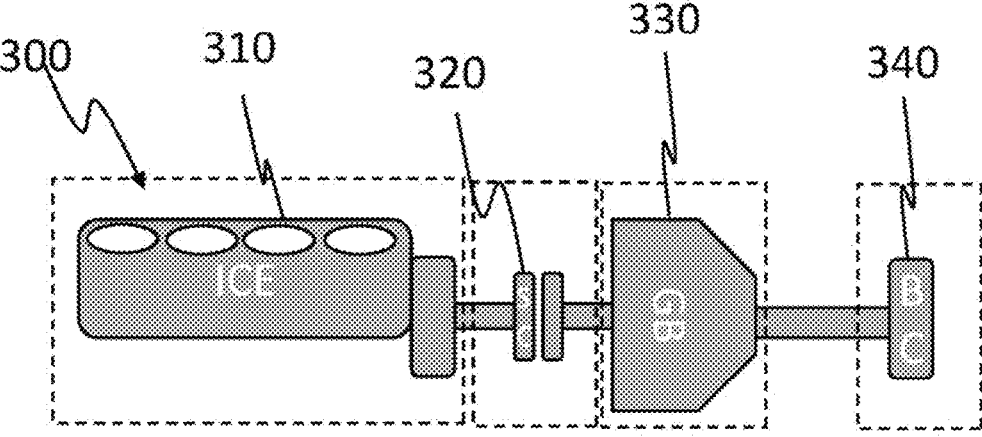
FIG. 13 shows a schematic diagram of a third powertrain according to this disclosure.

The connection parameter module defines the connections between the models shown in FIG. 9. For the second powertrain 200, the architecture includes a flow based connection between the AC synchronous motor and the load 220, as well as a separate inertance coupling to represent the inertia of the load 220. As such, the second powertrain model includes both effort connections and flow connections. The effort connections are specified by the effort weight parameters of the input file, and the flow connections are specified by the flow weigh parameters of the input file. Motor Vehicle Powertrain FIG. 12 shows a schematic diagram of a universal controller which has been configured to control a third powertrain 300. A schematic diagram of the third powertrain 300 is shown in FIG. 13. The third powertrain 300 comprises an internal combustion engine, 310, a clutch 320, a gearbox 330 and a drive output 340 (e.g. wheels). As such, the third powertrain 300 may be considered to be representative of a motor vehicle powertrain.

As with the previous examples, in order to configure the configurable powertrain model to model the third powertrain 300, the input file provides input parameters which identify each component model to be configured. In the third powertrain 300, an internal combustion engine is provided 310. The internal combustion engine 310 generates a torque (effort output) and also has an inertia associated with it.

The final drive output 340 receives a torque (effort output) and also has an inertance associated with it.

The third powertrain 300 is a more complex powertrain (relative to the generator powertrain 100 shown in FIGS. 6A and 6B) as a clutch 320 and gearbox 340 is provided between the power source (internal combustion engine 310) and the power sink (final drive 340).

In the third powertrain 300 the clutch 320 may be assumed to be connected to the internal combustion engine by a relatively short drive shaft, and so it is assumed that the clutch 320 is driven at the same angular velocity as the internal combustion engine 310. The clutch applies a torque to the gearbox 330 in accordance with the angular velocity applied to it. As such, the clutch 320 may be represented as a compliance based coupling which receives a flow from the internal combustion engine and final drive, and outputs an effort. Whilst in the example of the third powertrain 300, the drive shaft between the internal combustion engine 310 and the clutch 320 is not modelled as a separate component, in other examples where a higher fidelity model is provided the drive shaft could be modelled as a separate component.

The gearbox 330 is an example of a component which scales, or transforms the energy applied to it. In the case of a gearbox, the angular velocity output and torque output of the gearbox are scaled relative to the angular velocity input and torque input based on the gear ratio selected. To account for the presence of the gearbox 330 in the model of the third powertrain 300, the third component model of the final drive inertia may include an effort scaling module. The effort scaling module allows of an inertance coupling model may be used to account for components of a powertrain which scale efforts and flows in an energy domain (e.g. a transformer or a gearbox), or even components which convert energy between different energy domains (e.g. a motor generator).

Figure 14:
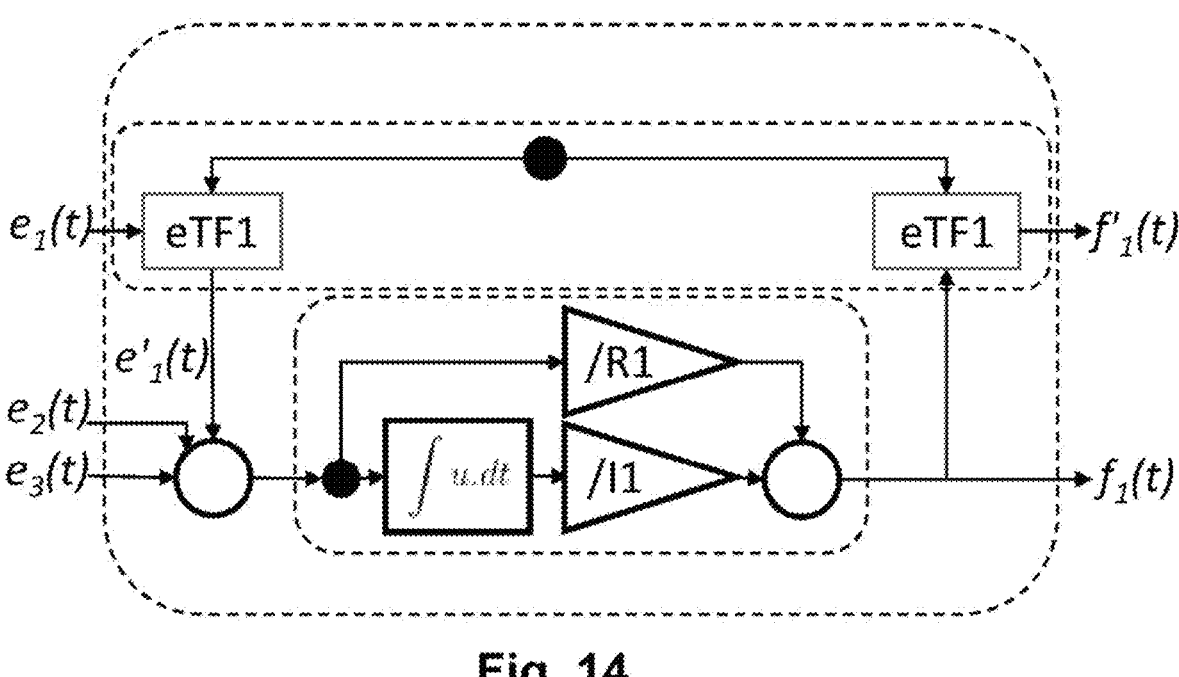
FIG. 14 shows a diagram of a generic inertance coupling model including an effort scaling module

Accordingly, the Final Drive Inertia model in FIG. 12 includes an effort scaling module which is configured to model the gearbox 330. A block diagram of a generic inertance coupling model including an effort scaling module is shown in FIG. 14. The effort scaling module is configurable to scale at least one of the effort inputs to the generic inertance coupling model (e.g. the effort output from one or more power source models, the effort output from one or more power sink models, and the effort output from one or more compliance based coupling models). As shown in FIG. 14, the scaling to the effort output is applied prior to the effort output being summed at the first effort sum junction. The scaling is applied at a first scaling block (eTF1) using a first scaling parameter of the input file. In the example of the third powertrain 300, a torque output from the clutch 320 is connected to the inertance coupling model of the Final Drive 340. It will be appreciated that the actual torque applied to the Final Drive will depend on the gear ratio of the gear box. Accordingly, the first scaling parameter may scale the effort output from the compliance based coupling model of the clutch 320 to account for the presence of the gearbox between the clutch 320 and the final drive inertia 340.

As shown in FIG. 12, a flow connection is also present between the final drive inertia 340 and the clutch 320. Due to the presence of the gearbox, the angular velocity of the final drive inertia may be scaled relative to the clutch angular velocity. Thus the flow output from the final drive inertia may also be scaled. As shown in FIG. 14, each third configurable model may include a scaled flow output. The scaled flow output may be calculated by the configurable third component model based on a first complementary scaling parameter of the input file. In the example of the gearbox, the first complementary scaling parameter is the inverse of the first scaling parameter. Thus, the flow and effort scaling of the gearbox is modelled in the model of the third powertrain whilst accounting for the conservation of energy.

In some embodiments, the scaling (or transform) component to be modelled may involve an amount of energy loss during the scaling process. In some powertrain models the energy loss may be accounted for using efficiency parameters of the effort scaling model. For example, there may be some energy loss in the gearbox 330 of FIG. 13 due to friction and wear of the gearbox. To account for this energy loss, a first efficiency parameter ($\eta_1$) may be applied when calculating the any scaled quantity. The first efficiency parameter may be specified in the input file. The first efficiency parameter is less than or equal to 1.

Thus, the effort scaling module may apply the following scalings to an effort input (e(t)), and flow output (f(t)) to calculate a scaled effort input (e'(t)) and scaled flow output (f'(t)) respectively:

$$e'(t) = e(t) \times k_1 \times \eta_1$$

$$f'(t) = f(t) \times k_1^{-1} \times \eta_1$$

Thus, the effort scaling module may be provided to model components of a powertrain which scale or transform efforts and flows.

In some embodiments, each effort scaling module is configurable to scale at least one of the: effort output from one or more power source models, the effort output from one or more power sink models, and the effort output from one or more compliance based coupling models such that it is transformed from an effort in an energy domain to an effort in another energy domain. For example, a motor-generator model may include effort inputs in the electrical energy domain and calculate flow outputs in the rotational mechanical energy domain.

Returning to the example of the third powertrain in FIG. 12, it will be appreciated that the third powertrain 300 comprises one effort power source (N=1). The final drive 340 acts as a power sink in this specific powertrain, and receives a torque. As such, the third powertrain 300 comprises one effort power sink (M=1). The final drive 340 also has an inertia associated with it. Accordingly, two inertance coupling models can be included in the powertrain model to account for the final drive inertia and the inertia of the internal combustion engine (Y=2). The internal combustion engine 310 is connected to the gearbox by drive shafts either side of the clutch 320. The drive shaft receives the flow output from the internal combustion engine 310 and transfers a torque to the gearbox via the clutch 320. Accordingly, the clutch 320 and drive shafts may be modelled as a compliance based coupling (Z=1). As discussed above, the effort (torque) input to the gearbox can be considered as a scaled effort input to the inertance coupling model of the drive inertia. Accordingly, an inertance coupling model including an effort scaling module may be used to model the gearbox and final drive inertia.

The input file provides the input parameters to configure the model as shown in FIG. 12. As such, the input file provides first, second, third, and fourth input parameters based on the components of the specific powertrain (N=1, M=1, X=3, Y=2, Z=1) as discussed above. Similar to FIGS. 8 and 9, FIG. 12 only shows the models of the configurable powertrain model which are utilised in the configured powertrain model of the third powertrain 300.

The connection parameter module defines the connections between the models shown in FIG. 12. For the third powertrain 300, the architecture includes an effort based connection between the internal combustion effort output and the inertance coupling model of the inertia of the internal combustion engine. This allows the powertrain model to account for the inertia of the internal combustion engine and also to account for the flow based drive of the clutch 320.

The above example of the third powertrain 300 utilised a generic inertance coupling model comprising an effort scaling module. The generic powertrain component library may include a plurality of generic inertance coupling models.

By analogy with the generic inertance coupling model, it will be appreciated the generic powertrain component library may also include generic compliance based coupling models comprising flow scaling models. The flow scaling module may be provided to model components which transform or scale flows to produce a corresponding scaled effort.

Thus, each configurable fourth component model may include a flow scaling module configurable to scale at least one of: the flow output from one or more power source models, the flow output from one or more power sink models, and the flow output from one or more inertance coupling models using a second scaling parameter ($k_2$) of the input file. Similar the effort output calculated by the configurable fourth component model may also be scaled by a second complementary scaling parameter of the input file.

Furthermore, the flow scaling module may also be configured to account for energy losses in the scaling component. Thus, each flow scaling module may be configurable to account for energy loss when scaling the at least one of: the flow output from one or more power source models, the flow output from one or more power sink models, and the flow output from one or more inertance coupling models based on a second efficiency parameter ($\eta_2$) of the input file, and/or when scaling the effort output calculated by the configurable fourth component model based on the second efficiency parameter.

In some embodiments, each flow scaling module is configurable to scale at least one of the: flow output from one or more power source models, the flow output from one or more power sink models, and the flow output from one or more inertance coupling models such that it is transformed from a flow in an energy domain to a flow in another energy domain.

Hybrid Powertrain

Figure 15:
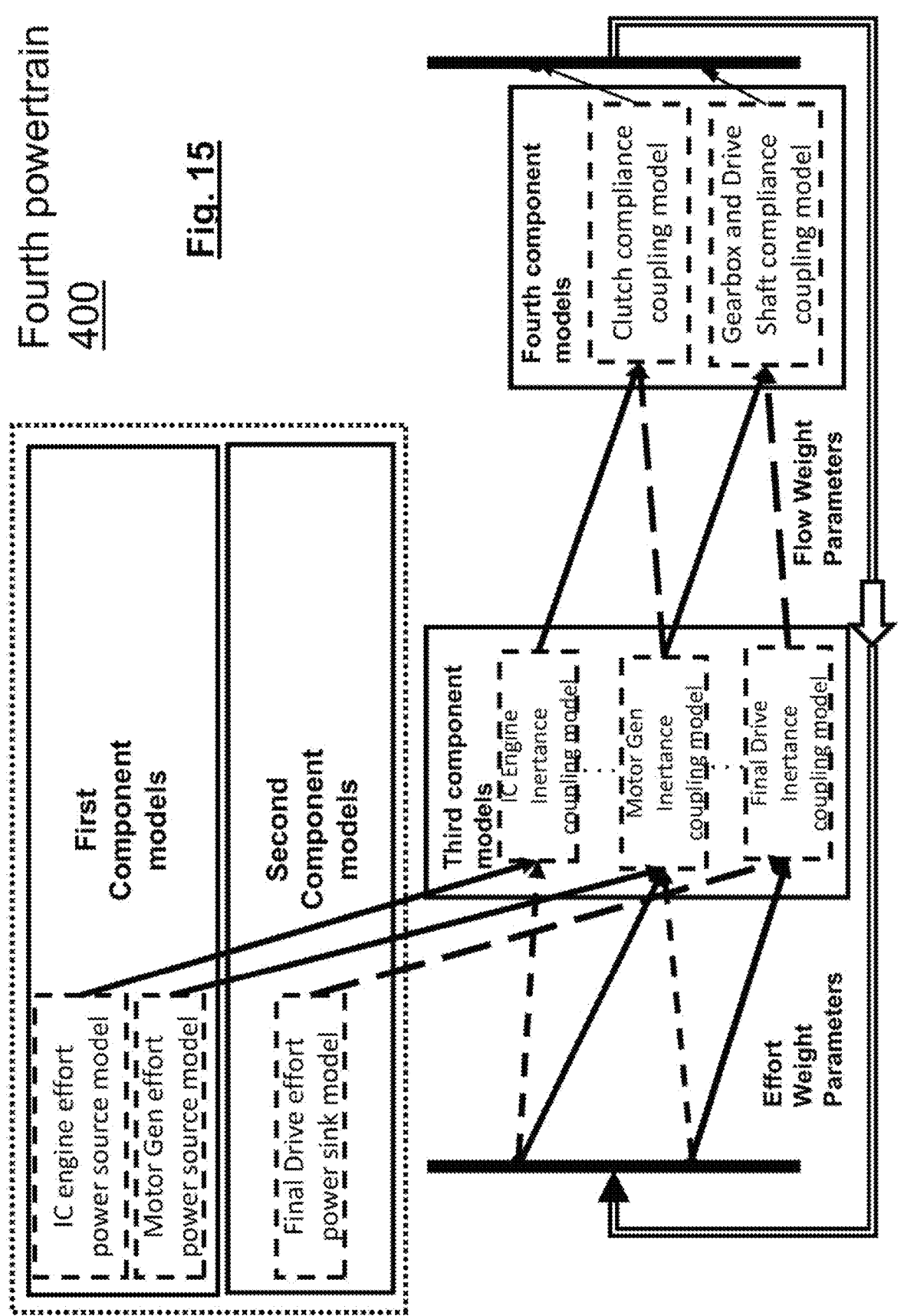
FIG. 15 shows a diagram of the universal controller configured to provide a powertrain model of the fourth powertrain
Figure 16:
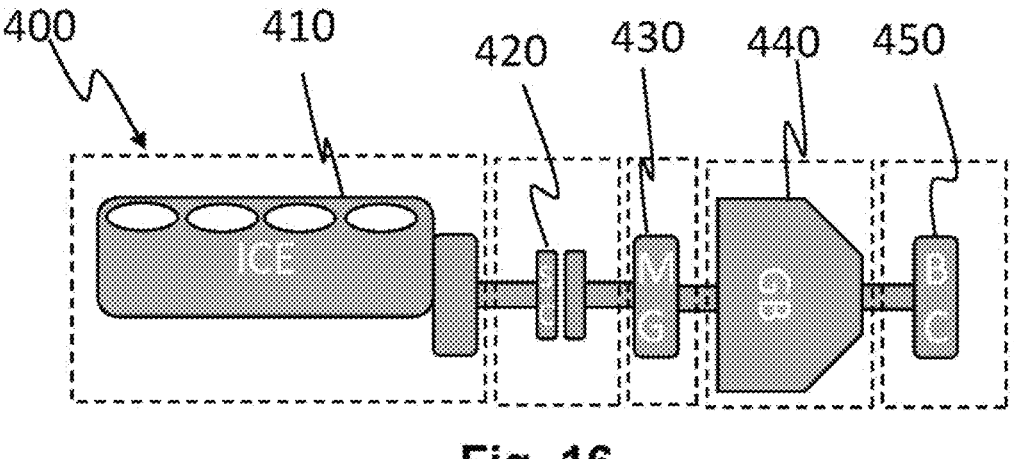
FIG. 16 shows a schematic diagram of a fourth powertrain according to this disclosure.

FIG. 15 shows a schematic diagram of a universal controller which has been configured to control a fourth powertrain 300. A schematic diagram of the fourth powertrain 400 is shown in FIG. 16. The fourth powertrain 400 comprises an internal combustion engine, 410, a clutch 420, a motor generator 430, a gearbox 440, and a drive output 450 (e.g. wheels). As such, the third powertrain 400 may be considered to be representative of a motor vehicle with a hybrid powertrain.

As with the previous examples, in order to configure the configurable powertrain model to model the fourth powertrain 400, the input file provides input parameters which identify each component model to be configured. In the fourth powertrain 400 the input file may include input parameters to configure models representative of: an internal combustion engine effort power source, an internal combustion engine inertia, a clutch, a motor generator effort power source, a motor generator inertia, a gearbox compliance based coupling model, a final drive power sink and a final drive inertia. The component models shown in FIG. 15 are one example of a set of component models which could be configured from the generic powertrain component library to model the fourth powertrain 400.

Figure 17:
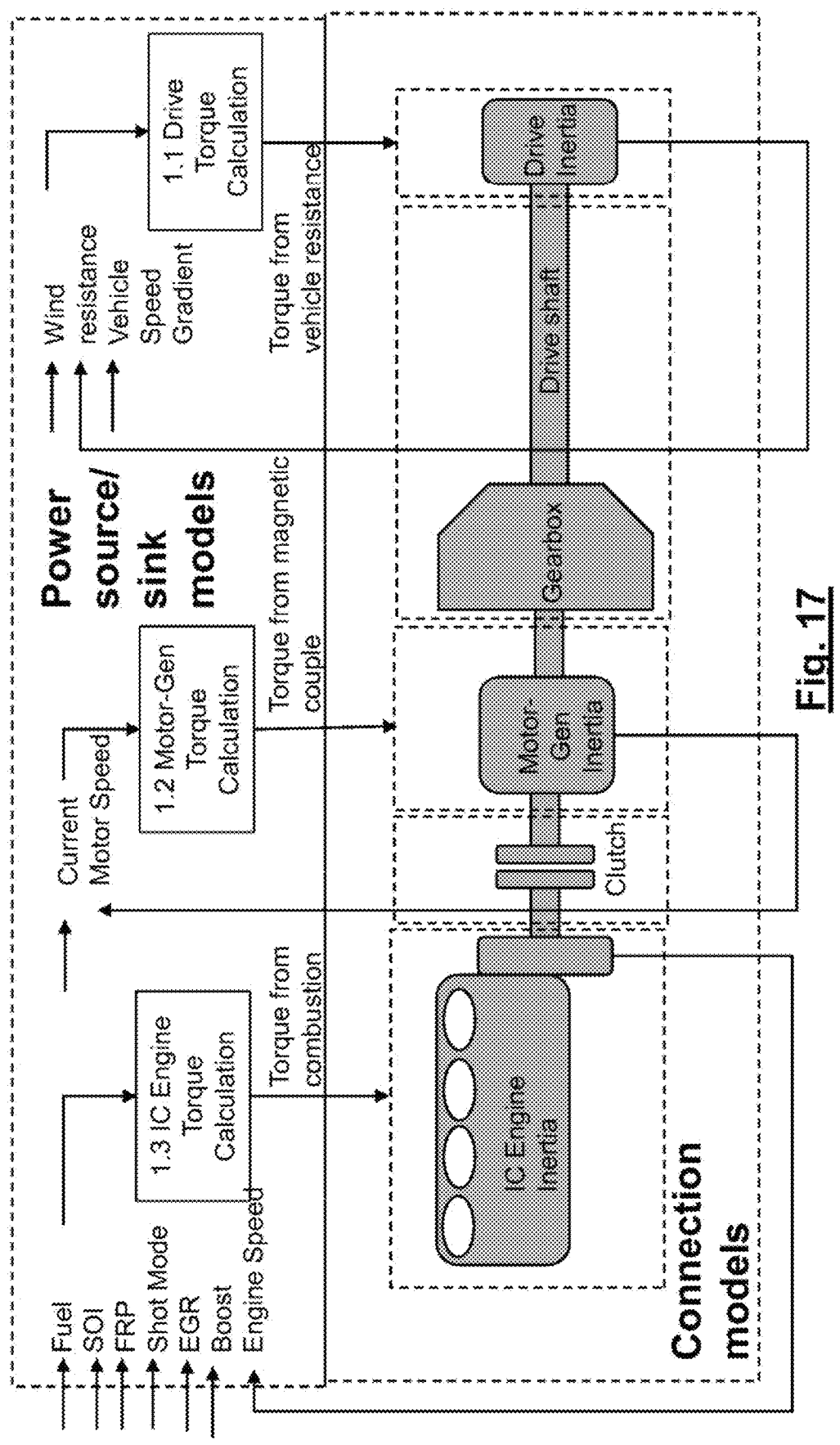
FIG. 17 shows an annotated diagram of a fourth powertrain according to this disclosure.

In this example, the fourth powertrain includes two different effort based power sources. The effort based power sources may be configured to receive different component specific inputs, based on the first input parameters of the input file. FIG. 17 shows an annotated diagram of FIG. 16, which shows the component specific inputs which may be provided for each of the power source models and the power sink model.

For example, in accordance with FIG. 17, the internal combustion engine effort power source model is configured to calculate an effort output representative of the torque from combustion. As shown in FIG. 17, the internal combustion engine effort power source model is configured to receive the component specific inputs: Exhaust gas recirculation (EGR), Start of Injection (SOI), Fuel Rail Pressure (FRP), Shot Mode, Turbo Boost, and Engine Speed in order to calculate the effort output. The motor generator effort power source model is configured to calculate an effort output representative of the torque from magnetic coupling. As shown in FIG. 17, the motor generator effort power source model is configured to receive the component specific inputs Current and motor speed.

Thus it will be appreciated that the universal controller may be configured to provide a powertrain model of a specific powertrain with a plurality of power sources. By analogy, the universal powertrain controller may also be configured to provide a powertrain model of a specific powertrain with a plurality of power sinks.

Industrial Applicability

According to this disclosure, a universal controller is provided. The universal controller may be configured to control any specific powertrain falling within the class of generic powertrains comprising J generic power sources, K generic power sinks, and L generic couplings, where (J, K, and L are positive, non-zero integers).

Accordingly, the universal controller may be configured to control powertrains for a variety of systems including, but not limited to: motor vehicles, electric vehicles, hybrid vehicles, marine vessels, electrical power generation equipment, manufacturing equipment, and aviation.

The universal controller is configurable to provide a powertrain model of a specific powertrain upon receipt of an input file comprising input parameters. Accordingly, the universal controller of this disclosure may be reliably and efficiently configure to model a specific powertrain. In particular, by using parameters to configure the universal controller, the controller does not need to be re-compiled in order to generate a new model. This allows the universal controller to be applied to a range of powertrain systems in a reliable and efficient manner, thus avoiding extensive software build and testing costs associated with powertrain controllers which are programmed and compiled for each specific powertrain.

The invention claimed is:

1. A universal controller for a powertrain, the universal controller comprising a configurable powertrain model, the configurable powertrain model configurable to model a class of generic powertrains comprising J generic power sources, K generic power sinks, and L generic couplings, wherein the universal controller is arranged to receive an input file comprising a plurality of input parameters to configure the configurable powertrain model of the universal controller to control a specific powertrain having a powertrain architecture comprising N power sources, M power sinks, and X couplings, the configurable powertrain model comprising:

(a) a generic powertrain component library configured to provide a model of each of the N power sources, M power sinks and X couplings of the specific powertrain, the generic powertrain component library comprising:

a plurality of configurable first component models from which N power source models are configurable based on first input parameters of the input file, the N power source models representative of the N power sources of the specific powertrain, wherein each first component model is configured to receive at least one of a plurality of first component specific inputs and to calculate an effort output or flow output based on the at least one of the plurality of first component specific inputs;

a plurality of configurable second component models from which lvi power sink models are configurable based on second input parameters of the input file, the M power sink models representative of the lvi power sinks of the specific powertrain wherein each second component model is configured to receive at least one of a plurality of second component specific inputs and to calculate an effort output or flow output based on at least one of the plurality of second component specific inputs; and a plurality of configurable third component models from which at least one inertance coupling model is configurable based on third input parameters of the input file, wherein each third component model is configured to receive a plurality of effort inputs and to calculate a flow output based on the effort inputs, and a plurality of fourth component models from which a compliance based coupling model is configurable based on fourth input parameters of the input file, wherein each fourth component model is configured to receive a plurality of flow inputs and to calculate an effort output;

wherein the inertance coupling models and the compliance based coupling models are representative of the X couplings of the specific powertrain, (b) a connection parameter module configured to define a model architecture of the N power source models, M power sink models and X coupling models which is representative of the powertrain architecture based on flow weight parameters and effort weight parameters of the input file, wherein the flow weight parameters define any flow connections from the flow outputs of the N power source models, the flow outputs of the M power sink models, and the flow outputs of the inertance coupling models of the X couplings to the flow inputs of the compliance based coupling models of the X couplings of the model architecture; and the effort weight parameters define any effort connections from the effort outputs of the N power source models, the effort outputs of the M power sink models, and the effort outputs of the compliance based coupling models of the X couplings to the effort inputs of the inertance coupling models of the X coupling models of the model architecture;

wherein the configurable powertrain model is configured to model the specific powertrain based on the N power source models, M power sink models, X coupling models, and the model architecture.

2. A universal controller according to claim 1, wherein each configurable third component model comprises a first effort sum junction configurable to calculate a net effort input for the third component model based on at least one of: the effort output from one or more power source models, the effort output from one or more power sink models, and the effort output from one or more compliance based coupling models, wherein the flow output is calculated based on the net effort input.

3. A universal controller according to claim 2, wherein each configurable third component model comprises an effort scaling module configurable to scale at least one of: the effort output from one or more power source models, the effort output from one or more power sink models, and the effort output from one or more compliance based coupling models using a first scaling parameter of the input file and to scale the flow output calculated by the configurable third component model by a first complementary scaling parameter of the input file.

4. A universal controller according to claim 3, wherein each effort scaling module may be configurable to account for energy loss when scaling the at least one of the effort output from one or more power source models, the effort output from one or more power sink models, and the effort output from one or more compliance based coupling models based on a first efficiency parameter of the input file, and/or when scaling the flow output calculated by the configurable third component model based on the first efficiency parameter.

5. A universal controller according to claim 3, wherein each effort scaling module is configurable to scale at least one of the: effort output from one or more power source models, the effort output from one or more power sink models, and the effort output from one or more compliance based coupling models such that it is transformed from an effort in an energy domain to an effort in another energy domain.

6. A universal controller according to claim 3, wherein the net effort input calculated by the first effort sum junction is based on efforts in the same energy domain.

7. A universal controller according to claim 1, wherein each configurable fourth component model comprises a first flow sum junction configured to calculate the net flow input for the fourth component model based at least one of; the flow output from one or more power source models, the flow output from one or more power sink models, and the flow output from one or more inertance coupling models.

8. A universal controller according to claim 7, wherein each configurable fourth component model comprises a flow scaling module configurable to scale at least one of: the flow output from one or more power source models, the flow output from one or more power sink models, and the flow output from one or more inertance coupling models using a second scaling parameter of the input file and to scale the effort output calculated by the configurable fourth component model by a second complementary scaling parameter of the input file.

9. A universal controller according to claim 8, wherein each flow scaling module may be configurable to account for energy loss when scaling the at least one of: the flow output from one or more power source models, the flow output from one or more power sink models, and the flow output from one or more inertance coupling models based on a second efficiency parameter of the input file, and/or when scaling the effort output calculated by the configurable fourth component model based on the second efficiency parameter.

10. A universal controller according to claim 8, wherein each flow scaling module is configurable to scale at least one of the: flow output from one or more power source models, the flow output from one or more power sink models, and the flow output from one or more inertance coupling models such that it is transformed from a flow in an energy domain to a flow in another enemy domain.

11. A universal controller according to of claim 8, wherein the net flow input calculated by the first flow sum junction is based on flow in the same energy domain.

12. A universal controller according to claim 1, wherein each third component model is configurable based on third input parameters of the input file comprising one or more of: a first resistance parameter, and a first inertance parameter in order to define air inertance coupling model.

13. A universal controller according to claim 1, wherein each fourth component model is configurable based on fourth input parameters of the input file comprising one or more of: a second resistance parameter, and a compliance parameter in order to define a compliance based coupling model.

14. A universal controller according to claim 1, wherein the specific powertrain to be controlled has a powertrain architecture comprising X couplings, wherein Y of the X couplings are inertance couplings and Z of the X couplings are compliance couplings;

Y inertance coupling models are configurable from the configurable third component models; and Z compliance based coupling models are configurable from the configurable fourth component models.

* * * * *